(12) United States Patent
Eriksson et al.

(10) Patent No.: US 11,194,057 B2
(45) Date of Patent: Dec. 7, 2021

(54) ASIL-CLASSIFICATION BY COOPERATIVE POSITIONING

(71) Applicant: VEONEER US INC., Southfield, MI (US)

(72) Inventors: Olof Eriksson, Älvsjö (SE); Tobias Aderum, Gothenburg (SE)

(73) Assignee: VEONEER US INC., Southfield, MI (US)

(*) Notice: Subject to any disclaimer, the term of this patent is extended or adjusted under 35 U.S.C. 154(b) by 144 days.

(21) Appl. No.: 16/571,438

(22) Filed: Sep. 16, 2019

(65) Prior Publication Data

US 2020/0013281 A1 Jan. 9, 2020

Related U.S. Application Data

(63) Continuation of application No. PCT/US2017/066964, filed on Dec. 18, 2017.

(30) Foreign Application Priority Data

Mar. 17, 2017 (EP) ..................................... 17161659

(51) Int. Cl.
  *G06F 19/00* (2018.01)
  *G01S 19/51* (2010.01)
  (Continued)

(52) U.S. Cl.
  CPC .............. *G01S 19/51* (2013.01); *B60R 21/01* (2013.01); *B60R 21/0134* (2013.01);
  (Continued)

(58) Field of Classification Search
  CPC ...... G01S 19/51; G01S 19/396; G01S 13/878; G01S 13/765; G01S 5/0072;
  (Continued)

(56) References Cited

U.S. PATENT DOCUMENTS 8,775,029 B2 * 7/2014 Hammerschmidt .... H04L 1/201
  701/45
9,494,430 B2 11/2016 Friend
  (Continued)

OTHER PUBLICATIONS

Beck, Anchor free node tracking using ranges, odometry, and multidimensional scaling, 2014 IEEE International Conference on Acoustics, Speech and Signal Processing (ICASSP), IEEE, May 4, 2014 (May 4, 2014), pp. 2209-2213.
(Continued)

*Primary Examiner* — Adam M Alharbi
(74) *Attorney, Agent, or Firm* — Christopher P. Maiorana, PC

(57) ABSTRACT

An apparatus comprising a transceiver, an antenna and a processor. The transceiver may be configured to send/receive data messages to/from a plurality of vehicles. The antenna may be configured to receive signals from GNSS satellites. The processor may be configured to (i) determine a first region based on relative coordinates calculated using the data messages, (ii) determine a second region calculated using the signals received from the GNSS satellites, (iii) determine whether a pre-determined amount of the first region to the second region overlap and (iv) increase a confidence level of a positional accuracy of the plurality of vehicles if the pre-determined amount of the first region and the second region overlap. One of the vehicles implements one or more automatic responses based on the confidence level of the positional accuracy.

16 Claims, 12 Drawing Sheets

(51) Int. Cl.

| | |
|---|---|
| *H04W 4/46* | (2018.01) |
| *B60W 30/095* | (2012.01) |
| *G01S 19/48* | (2010.01) |
| *G08G 1/16* | (2006.01) |
| *G01S 5/00* | (2006.01) |
| *G01S 5/02* | (2010.01) |
| *H04L 12/26* | (2006.01) |
| *H04W 56/00* | (2009.01) |
| *G01S 19/39* | (2010.01) |
| *B60R 21/01* | (2006.01) |
| *B60R 21/0134* | (2006.01) |
| *B60R 21/231* | (2011.01) |
| *B60R 21/36* | (2011.01) |
| *B60R 22/48* | (2006.01) |
| *G08G 1/01* | (2006.01) |
| *G05D 1/00* | (2006.01) |
| *G05D 1/02* | (2020.01) |
| *G08G 1/00* | (2006.01) |
| *G01S 13/87* | (2006.01) |

(52) U.S. Cl.
CPC ........ *B60R 21/23138* (2013.01); *B60R 21/36* (2013.01); *B60R 22/48* (2013.01); *B60W 30/0953* (2013.01); *G01S 5/0072* (2013.01); *G01S 5/0289* (2013.01); *G01S 13/878* (2013.01); *G01S 19/396* (2019.08); *G01S 19/48* (2013.01); *G05D 1/0022* (2013.01); *G05D 1/0027* (2013.01); *G05D 1/0214* (2013.01); *G05D 1/0217* (2013.01); *G05D 1/0295* (2013.01); *G08G 1/0112* (2013.01); *G08G 1/0133* (2013.01); *G08G 1/161* (2013.01); *G08G 1/164* (2013.01); *G08G 1/166* (2013.01); *G08G 1/22* (2013.01); *H04L 43/0864* (2013.01); *H04W 4/46* (2018.02); *H04W 56/006* (2013.01); *H04W 56/0065* (2013.01); *B60R 2021/01088* (2013.01); *B60R 2021/01231* (2013.01); *B60R 2021/01272* (2013.01); *B60W 2554/80* (2020.02); *B60W 2556/65* (2020.02); *G01S 2205/002* (2013.01)

(58) Field of Classification Search
CPC . G01S 5/0289; G01S 2205/002; B60R 21/01; B60R 21/0134; B60R 21/23138; B60R 21/36; B60R 22/48; B60R 2021/01088; B60R 2021/01231; B60R 2021/01272; G08G 1/0112; G08G 1/0133; G08G 1/161; G08G 1/166; B60W 60/0059; B60K 2370/175
USPC ........................................................ 701/117
See application file for complete search history.

(56) References Cited

U.S. PATENT DOCUMENTS

| | | | |
|---|---|---|---|
| 9,535,160 B2* | 1/2017 | Bardout | .................. G01S 19/13 |
| 9,786,182 B2* | 10/2017 | Calmettes | ............ G05D 1/0293 |
| 2011/0238306 A1 | 9/2011 | Miucic | |
| 2013/0261947 A1 | 10/2013 | Yamashiro | |
| 2013/0293394 A1 | 11/2013 | Rubin et al. | .................. 340/902 |
| 2014/0180579 A1 | 3/2014 | Friend | |
| 2014/0222280 A1 | 8/2014 | Salomonsson et al. | ........ 701/28 |
| 2015/0262487 A1 | 9/2015 | Cazanas | |
| 2015/0269845 A1 | 9/2015 | Calmettes et al. | |
| 2016/0341557 A1 | 11/2016 | Kondo | |
| 2018/0107473 A1* | 4/2018 | Ahmed | .................... H04L 67/34 |
| 2018/0114441 A1* | 4/2018 | Marmet | ................. G08G 1/163 |
| 2018/0267535 A1* | 9/2018 | Robert | ................. G05D 1/0257 |

OTHER PUBLICATIONS

Theobald, Empirical Bayes hierarchical models for regularizing maximum likelihood estimation in the matrix Gaussian Procrustes problem, Proceedings National Academy of Sciences PNAS, vol. 103, No. 49, Dec. 5, 2006 (Dec. 5, 2006), pp. 18521-18527.

Hamed, Precise realtime localization by RF transceiver ToF measurements, Advanced Robotics, 2009. ICAR 2009. International Conference on, IEEE, Piscataway, NJ, USA, Jun. 22, 2009 (Jun. 22, 2009), pp. 1-6.

Lu, Methods for Certification of GNSS-based Safe Vehicle Localization in Driving Assistance Systems, 2015 International Conference on Connected Vehicles Expo (ICCVE), IEEE, Oct. 19, 2015, 226-231.

* cited by examiner

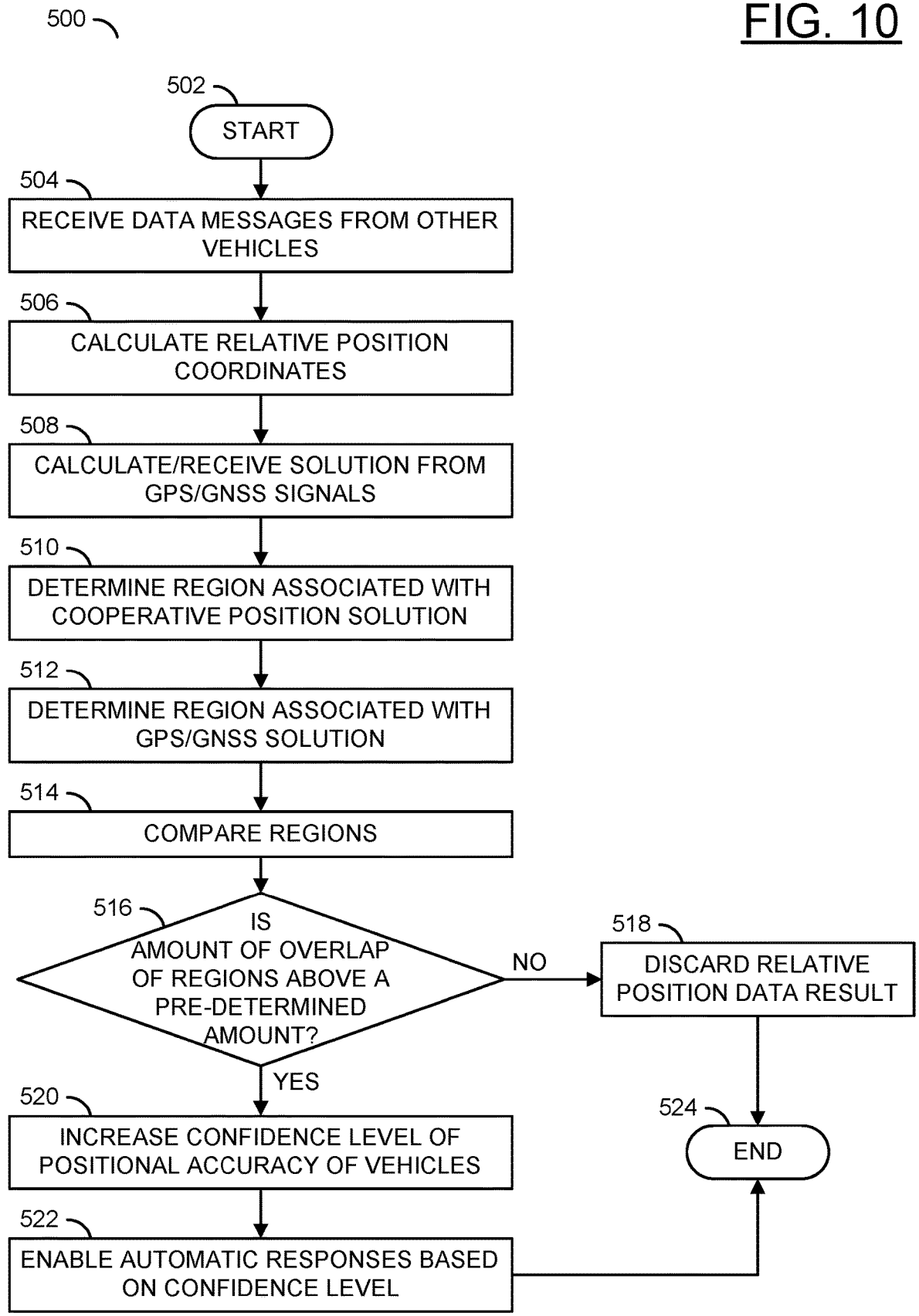

ASIL-CLASSIFICATION BY COOPERATIVE POSITIONING

This application relates to International Application PCT/US2017/066964, with an International Filing Date of Dec. 18, 2017, which claims the benefit of EP Application No. EP17161659.2, filed Mar. 17, 2017, each of which is incorporated by reference in its entirety.

FIELD OF THE INVENTION

The present invention relates to object positioning generally and, more particularly, to improved ASIL-classification by cooperative positioning.

BACKGROUND OF THE INVENTION

Positioning of objects (i.e., vehicles, buildings, pedestrians, etc.) can be determined using GPS (Global Positioning System) or GNSS (Global Navigation Satellite System). Some applications that use positioning, such as assisted driving, need high precision data to be implemented safely. To calculate high precision data with GPS/GNSS, real-time kinematics (RTK) with base-stations are used, which is currently not viable for commercial use. Host vehicle gyros can also be used to estimate a future expected trajectory of objects, but if the initial GPS/GNSS position is incorrect the problem cannot be solved correctly.

In assisted driving applications, such as active intervention, knowledge of the positions of surrounding vehicles with high accuracy is utilized, which is currently implemented using many different sensors covering 360 degrees around a vehicle. There are many vehicle environment detection systems, such as camera systems, Doppler radar systems and LIDAR systems. Inaccuracies can lead to both false-positives and false-negatives. GPS/GNSS does not provide a sufficient degree of accuracy, especially in urban conditions.

Using periodic broadcasts to perform inter-vehicle range estimation can be used to obtain a high degree of accuracy regarding relative positioning between objects. Determining highly accurate relative positioning between objects introduces additional issues. One such issue is that position accuracy with GPS/GNSS systems generally do not give precision sufficient for map navigation in cases where the host vehicle is driving on a close parallel road (i.e., like an exit ramp). Furthermore, position accuracy with GPS/GNSS systems generally do not provide sufficient precision for active intervention like active braking or steering in applications like forward collision warning (FCW), intersection movement assist (IMA), left turn assist (LTA), automated emergency braking (AEB), blind spot warning (BSW) and lane change warning (LCW). To improve an ASIL-classification additional relative positioning information is needed in the current vehicle sensor system.

It would be desirable to implement improved ASIL-classification by cooperative positioning.

SUMMARY OF THE INVENTION

The present invention concerns an apparatus comprising a transceiver, an antenna and a processor. The transceiver may be configured to send/receive data messages to/from a plurality of vehicles. The antenna may be configured to receive signals from GNSS satellites. The processor may be configured to (i) determine a first region based on relative coordinates calculated using the data messages, (ii) determine a second region calculated using the signals received from the GNSS satellites and (iii) determine whether a pre-determined amount of the first region to the second region overlap and (iv) increase a confidence level of a positional accuracy of the plurality of vehicles if the pre-determined amount of the first region and the second region overlap. One of the vehicles implements one or more automatic responses based on the confidence level of the positional accuracy.

BRIEF DESCRIPTION OF THE DRAWINGS

Embodiments of the invention will be apparent from the following detailed description and the appended claims and drawings in which:

FIG. 10 is a flow diagram illustrating a method for increasing a confidence level of positional accuracy of vehicles;

DETAILED DESCRIPTION OF THE PREFERRED EMBODIMENTS

Embodiments of the present invention include providing improved ASIL-classification by cooperative positioning that may (i) cross-reference a GNSS solution and a cooperative positioning solution, (ii) use a cooperative positioning solution as an independent measurement of positioning data, (iii) increase an Automotive Safety Integrity Level (ASIL), (iv) reduce a number false positives and/or false negatives, (v) increase effectiveness of positioning in scenarios with poor GNSS coverage, (vi) be used to activate automatic responses, (vii) be used to determine which automatic response to activate, (viii) provide positioning data to other vehicle systems and/or (ix) be easy to implement.

Grouping and/or clustering may be used in telecommunication. Additionally, grouping and/or clustering may be implemented in the area of cooperative positioning, which is described in, "Improving Cooperative Positioning for Vehicular Networks", IEEE Transactions of Vehicular Technology, Vol 60, no. 6 Jul. 2011, appropriate portions of which are incorporated by reference. In an example, grouping may be performed by approximate position and/or vehicle kinetics. A propagation delay of a wireless signal from a transmitter to a receiver may be used to estimate a distance. In one example, a round-trip time (RTT) (e.g., a round-trip delay time) may be used for estimating a distance accurately by sending a wireless signal between vehicles and/or objects (e.g., one at a time). Using periodic broadcasts is described in the paper "Inter-vehicle range estimation from periodic broadcasts" by Urs Niesen, Venkatesan N. Ekambaram, Jubin Jose, and Xinzhou Wu, appropriate portions of which are incorporated by reference. In order to establish initial positions from the measured ranges, Multi-Dimensional Scaling (MDS) may be used. MDS is described in the paper "Joint relative position and velocity estimation for an anchorless network of mobile nodes" by Raj Thilak Rajan, Geert Leus, and Alle-Jan van der Veen, appropriate portions of which are incorporated by reference.

Figure 1:
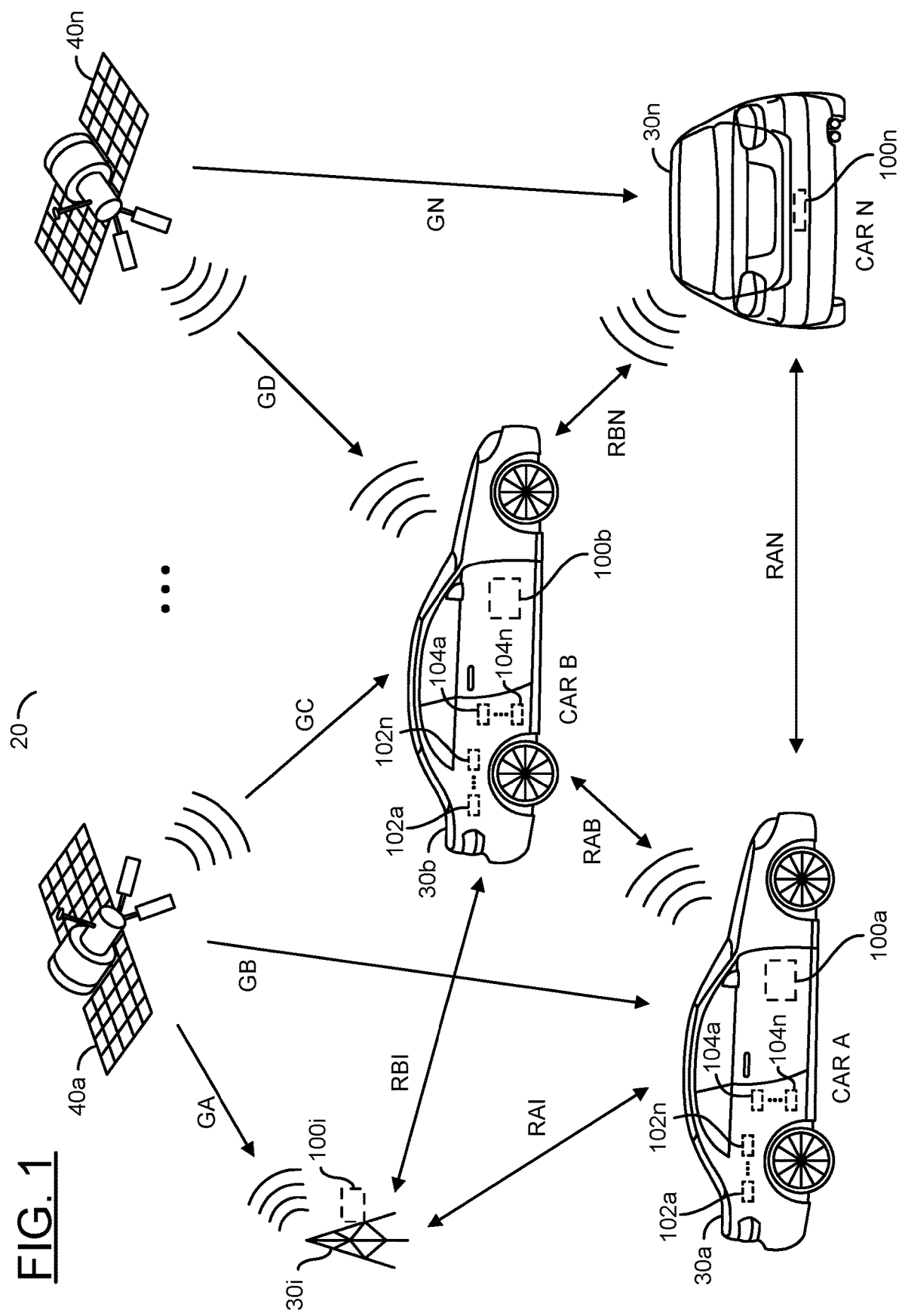
FIG. 1 is a diagram illustrating an embodiment of the present invention.

Referring to FIG. 1, a diagram illustrating an embodiment of the present invention is shown. An example system 20 is shown. The system 20 may comprise a number of objects 30a-30n and/or a number of communication satellites 40a-40n. In the example shown, the objects may comprise a combination of vehicles and/or base stations (e.g., infrastructure). In the example shown, two of the communication satellites 40a-40n are shown as a representation of a Global Positioning System (GPS) and/or Global Navigation Satellite System (GNSS) located around the world. In the example shown, the objects 30a, 30b and/or 30n may be vehicles and the object 30i may be a base station (e.g., a road side unit (RSU)). In some embodiments, each of the objects 30a-30n may be a vehicle (e.g., no base stations). The number of vehicles and/or base stations 30a-30n and/or communication satellites 40a-40n may be varied according to the design criteria of a particular implementation. The system 20 may be configured to adjust and/or self-correct for various numbers of the vehicles and/or base stations 30a-30n and/or communication satellites 40a-40n.

Each of the objects 30a-30n may comprise a respective apparatus (or circuit or module) 100a-100n. The modules 100a-100n may be described in more detail in connection with FIG. 2. The modules 100a-100n may be implemented within and/or attached to the objects 30a-30n. In the example shown, the module 100a is shown within the vehicle 30a and the module 100i is attached to the base station 30i. For example, the modules 100a-100n may be located within a dashboard and/or with other electronics of the vehicles 30a-30n. In some embodiments, the modules 100a-100n may be implemented in a mobile device (e.g., a cell phone, tablet computing device, a computer, a stand-alone GPS device, a fitness monitoring device, a smartwatch, etc.). In an example, the mobile device implementing the modules 100a-100n may be operated within a vehicle that is moving. The location of and/or how the modules 100a-100n are connected to the objects 30a-30n may be varied according to the design criteria of a particular implementation.

In the example shown, the objects 30a-30n and/or the respective modules 100a-100n may be configured to communicate with the communication satellites 40a-40n. Generally, four or more of the communication satellites 40a-40n may be connected (e.g., via wireless communication signals). In another example, the connection to the satellites 40a-40n may be implemented through a GPS-type connection. The satellites 40a-40n may present signals (e.g., GA-GN). An example implementation uses a Global Navigation Satellite System (GNSS) or Global Positioning System (GPS). Location information (e.g., coordinates) may be calculated (e.g., by the modules 100a-100n and/or other components of the objects 30a-30n) from the signals GA-GN received from GNSS or GPS. The positional accuracy of the location information may be determined by the modules 100a-100n.

In some embodiments, the modules 100a-100n may be configured to receive the signals GA-GN sent by the satellites 40a-40n. The modules 100a-100n may be configured to calculate the location information (e.g., position data, coordinates, etc.) of the respective vehicles 30a-30n based on the data in the signals GA-GN. In some embodiments, the objects 30a-30n (e.g., a GPS module) may present the calculated location data to the modules 100a-100n. In some embodiments, (e.g., clear sky conditions with limited and/or no interference and/or multipath errors), the positional accuracy of the location information calculated from the signals GA-GN may be within an acceptable tolerance to provide one independently calculated source of positional data.

Local conditions may be any type of interference and/or multipath factor that may affect a determination of location information (e.g., position coordinates) using the signals GA-GN. For example, the local conditions may be due to ionospheric interference, noise, signal degradation caused by dense urban areas, signal degradation caused by tall buildings, etc. The modules 100a-100n may be configured to supplement and/or enhance the accuracy of the location data of the objects 30a-30n determined from the signals GA-GN by using cooperative positioning. For example, the modules 100a-100n may be configured to provide location data that is more accurate than location data calculated using the signals GA-GN.

In some embodiments, infrastructure (e.g., the base station 30i, in the example shown) may be implemented as a fixed base station, such as a cellular tower, a user installed fixed base station, and/or another type of fixed base station. While only the base station 30i is shown, generally more than one of the base stations 30i may be implemented to provide signals used to calculate the location information. In some embodiments, since the base station 30i may be at a known and fixed location, the base station 30i may be connected to the satellites 40a-40n, calculate location information from the signals GA-GN and provide a verification of the signals GA-GN compared to the known and fixed location of the base station 30i.

In one example, the modules 100a-100n are shown located in the vehicles 30a-30n. The modules 100a-100n may be implemented as a single unit (e.g., an installed device and/or module) and/or a distributed unit. For example, various components of the modules 100a-100n may be implemented at various locations in and/or on the vehicles 30a-30n and connected by an electronic network connecting one or more of the components and enabling a sharing of information in the form of digital signals (e.g., a serial bus, an electronic bus connected by wiring and/or interfaces, a wireless interface, etc.). In some embodiments, the modules 100a-100n may be implemented in an infotainment module of the vehicles 30a-30n.

The vehicles 30a-30n may each comprise a number of blocks (or circuits) 102a-102n and/or blocks (or circuits) 104a-104n. The circuits 102a-102n may be configured to implement sensors. The circuits 104a-104n may be configured to implement actuators. The sensors 102a-102n and/or the actuators 104a-104n may be connected through an electronic bus (to be described in association with FIG. 2) and/or a wireless connection. In some embodiments, the sensors 102a-102n and/or the actuators 104a-104n may be configured to communicate with the modules 100a-100n. The sensors 102a-102n may be configured to capture information from the environment near the vehicles 30a-30n. The actuators 104a-104n may be configured to cause the vehicles 30a-30n and/or components of the vehicles 30a-30n to perform an action. In some embodiments, the sensors 102a-102n and/or the actuators 104a-104n may be configured to read data to detect objects and/or perform actions in response to the detected objects to cause the vehicles 30a-30n to implement functions such as speed control, collision prediction, collision prevention, automatic alignment, online bumper fascia calibration, motion estimation, dead reckoning, Intersection Movement Assist (IMA), Left Turn Assist (LTA), Forward Collision Warning (FCW), Lane Change Warning (LCW) and/or scene understanding.

The modules 100a-100n may be configured to communicate signals (e.g., RAA-RNN). The signals RAA-RNN may be communicated between the modules 100a-100n to determine a relative distance between the objects 30a-30n. Generally, each of the modules 100a-100n may transmit one of the signals RAA-RNN to each of the modules 100a-100n (e.g., within a particular range). In the example shown, the module 100a may transmit the signal RAB to the module 100b, the signal RAI to the module 100i and the signal RAN to the module 100n. Similarly, in the example shown, the module 100b may transmit the signal RAB to the module 100a, the signal RBI to the module 100i and the signal RBN to the module 100n. The number of the signals RAA-RNN may be varied according to the design criteria of a particular implementation.

The signals RAA-RNN may be used by the modules 100a-100n to calculate a value of the range between the objects 30a-30n. In an example, the signals RAA-RNN may be configured similarly to a radar to measure the amount of time a transmitted signals takes to be sent to a destination and/or return from a destination. For example, the module 100a may perform ranging (e.g., determine the absolute distance between the objects 30a and 30b) by transmitting the signal RAE to the module 100b and measuring how long before the signal RAB returns to the module 100a (e.g., a round-trip time). The communication used to transmit the signal RAA-RNN may be implemented through a cellular network connection (e.g., 3G, 4G, 5G LTE, etc.), a Wi-Fi connection, a GPS-type connection, a radio signal, an ultrasonic signal and/or another type of wireless connection. In one example, the signals RAA-RNN may be implemented on a particular wireless frequency spectrum (e.g., 5.9 GHz Dedicated Short Range Communication spectrum). In another example, the signals RAA-RNN may be implemented as and/or alongside a Basic Safety Message (BSM). In yet another example, Wi-Fi may be implementing and the signals RAA-RNN may be part of a lower layer protocol configured to transmit timestamps (e.g., MAC and/or PHY). The signals RAA-RNN may be used to implement vehicle-to-vehicle (e.g., V2V) and/or vehicle-to-infrastructure (e.g., V2I) communication (e.g., V2X communication). The type of wireless connection used to communicate between the modules 100a-100n may be varied according to the design criteria of a particular implementation.

The relative positioning values (e.g., coordinates) calculated by the modules 100a-100n using the signals RAA-RNN may be configured to enable an implementation of cooperative positioning. The cooperative positioning and/or relative coordinates determined by the modules 100a-100n may have a greater accuracy than the location information determined using the signals GA-GN (e.g., using GNSS data). The cooperative positioning information may be fused with data acquired using the sensors 102a-102n and/or data generated using the signals GA-GN. The higher accuracy and/or precision of the relative position between the objects 30a-30n may reduce uncertainty, reduce a number of false positives, reduce erroneous data calculations and/or enable an improved Automotive Safety Integrity Level (ASIL) classification. For example, in urban scenarios with poor GNSS coverage, there may be GPS uncertainty and relying on GPS information may generate a large number of false positives and/or false negatives. The cooperative positioning may be used together with map information to provide improved navigation information.

The modules 100a-100n may be configured to enable sensor and/or data fusion. For example, the modules 100a-100n may be configured to receive data from one or more (e.g., disparate) sources (e.g., the signals GA-GN, the signals RAA-RNN, the sensors 102a-102n, etc.). The modules 100a-100n may combine and/or analyze the data from the different sources to make inferences about the environment surrounding the objects 30a-30n. The inferences made by the module 100a-100n may provide a greater accuracy and/or precision of data (e.g., relative positioning) than using one of the sources of data alone.

Figure 2:
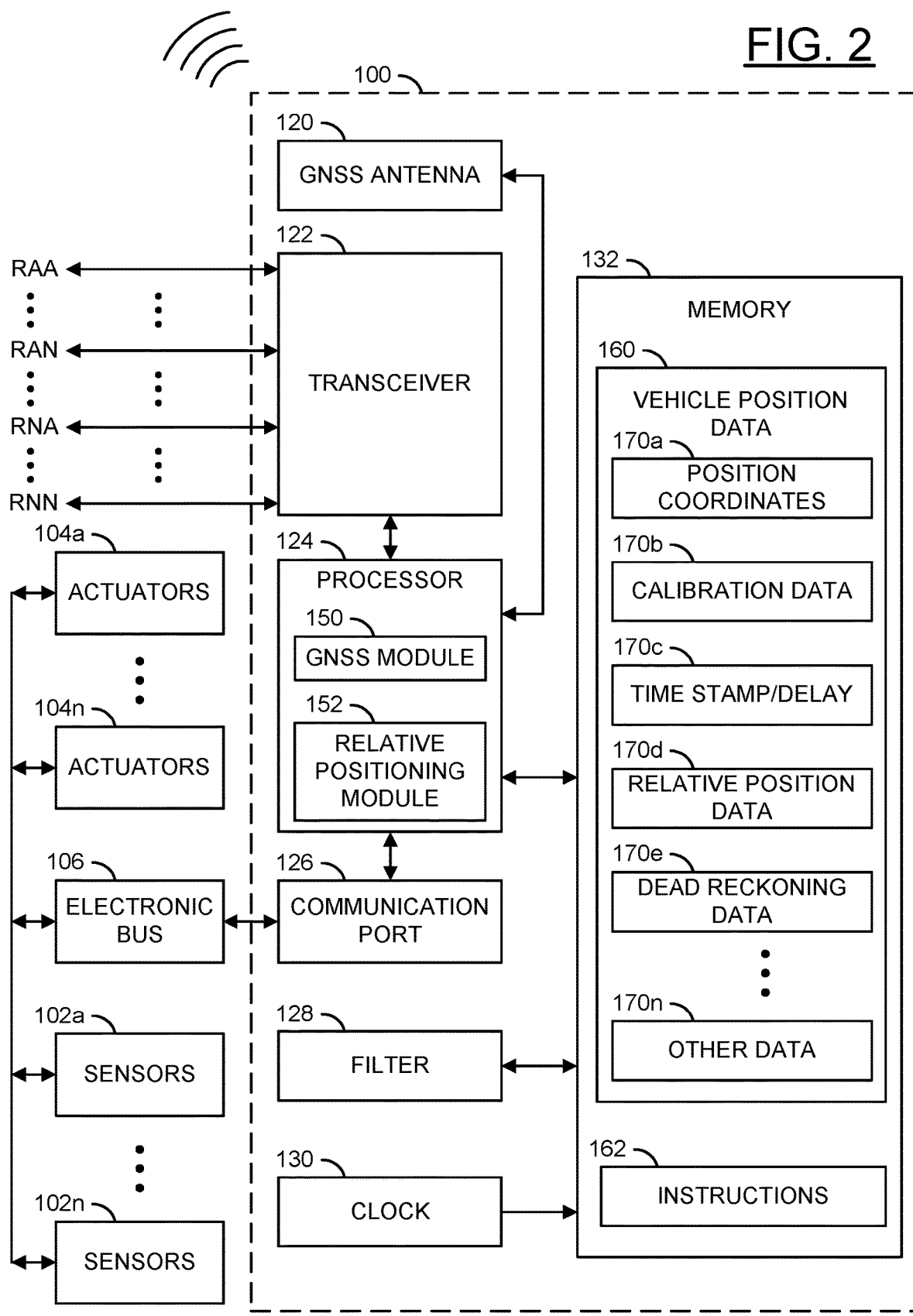
FIG. 2 is a diagram illustrating a module configured to determine high-precision range estimation.

Referring to FIG. 2, a diagram illustrating an example one of the modules 100a-100n configured to determine high-precision range estimation is shown. The module 100 is shown as a representative example of one of the modules 100a-100n. The module 100 may be configured to generate and/or calculate a position relative to other vehicles. The module 100 is shown transmitting/receiving the signals RAA-RNN. The module may send/receive other signals (not shown). For example, the module 100 may receive one or more of the signals GA-GN. The number and/or type of signals sent and/or received by the module 100 may be varied according to the design criteria of a particular implementation.

The module 100 may be connected to a block (or circuit) 106. The circuit 106 may implement an electronic bus. The electronic bus 106 may be configured to transfer data between the module 100 and the sensors 102a-102n and/or the actuators 104a-104n. In some embodiments, the electronic bus 106 may be implemented as a vehicle CAN bus. The electronic bus 106 may be implemented as an electronic wired network and/or a wireless network. Generally, the electronic bus 106 may connect one or more components of the vehicle 30 to enable a sharing of information in the form of digital signals (e.g., a serial bus, an electronic bus connected by wiring and/or interfaces, a wireless interface, etc.).

The module 100 generally comprises a block (or circuit) 120, a block (or circuit) 122, a block (or circuit) 124, a block (or circuit) 126, a block (or circuit) 128, a block (or circuit) 130 and/or a block (or circuit) 132. The circuit 120 may implement a GNSS antenna. The circuit 122 may implement a transceiver. The circuit 124 may implement a processor. The circuit 126 may implement a communication port. The circuit 128 may implement a filter. The circuit 130 may implement a clock. The circuit 132 may implement a memory. Other blocks (not shown) may be implemented (e.g., I/O ports, power connectors, interfaces, etc.). The number and/or types of circuits implemented by the module 100 may be varied according to the design criteria of a particular implementation.

The antenna 120 may be implemented as a dual band antenna capable of connecting to both a cellular network (e.g., to provide a potential connection option to the base stations 30i) and/or a GNSS network (e.g., the communication satellites 40a-40n). In another example, the antenna 120 may be implemented as two antennas. For example, one antenna may be specifically designed to connect to the base station(s) (e.g., 30i), while another antenna may be implemented to connect to the GNSS network satellites 40a-40n. The antenna 120 may be implemented as discrete antenna modules and/or a dual band antenna module. In some embodiments, the antenna 120 may be implemented as an off-board circuit (e.g., a component that is not part of the module 100). For example, the antenna 120 may send/receive data to/from the module 100 via the electronic bus 106. The implementation of the antenna 120 may be varied according to the design criteria of a particular implementation.

The transceiver 122 may be configured to communicate (e.g., send and/or receive) data (e.g., radio signals). The transceiver 122 may be configured to generate and/or receive one or more of the signals RAA-RNN. The transceiver 122 may receive data from the processor 124 to communicate with external devices (e.g., other of the modules 100a-100n). The transceiver 122 may receive communications from external devices (e.g., other of the modules 100a-100n) and transmit the communication signals to the processor 124. The transceiver 122 may be configured to communicate a Basic Safety Message (BSM) protocol and/or data outside the BSM protocol. In some embodiments, the transceiver 122 may send and/or receive the signals RAA-RNN through the communication port 126 and/or the sensors 102a-102n. The transceiver 122 may be configured to be compatible with one or more communications protocols (e.g., a Wi-Fi transceiver configured to perform dedicated short-range communication (DSRC), vehicle to vehicle (V2V) and/or vehicle to infrastructure (V2I) communication). The implementation of the transceiver 122 may be varied according to the design criteria of a particular implementation.

The processor 124 may be implemented as a microcontroller. The processor 124 may comprise a block (or circuit) 150 and/or a block (or circuit) 152. The circuit 150 may implement a GNSS module and/or chipset. The circuit 152 may implement a relative positioning module. The processor 124 may comprise other components (not shown). In some embodiments, the processor 124 may be a combined (e.g., integrated) chipset implementing processing functionality, the relative positioning chipset 152 and/or the GNSS chipset 150. In some embodiments, the processor 124 may be comprised of a number of separate circuits (e.g., the microcontroller, the GNSS chipset 150 and/or the relative positioning chipset 152). The GNSS module 150 and/or the relative positioning module 152 may each be an optional component of the processor 124. In an example, an off-board circuit (e.g., a component that is not part of the module 100) may perform the functions of the GNSS chipset 150 and send information to the module 100 (e.g., via the bus 106). In another example, an off-board circuit (e.g., a component that is not part of the module 100 such as a distributed and/or scalable computing service) may perform functions for determining the cooperative positioning data and send information to the module 100 (e.g., via the bus 106). The design of the processor 124 and/or the functionality of various components of the processor 124 may be varied according to the design criteria of a particular implementation. The processor 124 is shown sending data to and/or receiving data from the antenna 120, the transceiver 122, the memory 132 and/or the communication port 126.

The memory 132 may comprise a block (or circuit) 160 and a block (or circuit) 162. The block 160 may store vehicle position data. The block 162 may store computer readable instructions (e.g., instructions readable by the processor 124). The vehicle position data 160 may store various data sets 170a-170n. For example, the data sets 170a-170n may comprise position coordinates 170a, calibration data 170b, a time stamp/delay 170c, relative position data 170d, dead reckoning data 170e and/or other data 170n.

The position coordinates 170a may store location information data calculated and/or received by the module 100 from the signals GA-GN presented by the GNSS satellites 40a-40n. The signals GA-GN may provide data from which a particular resolution of location information positional accuracy may be calculated. In some embodiments, the position coordinates 170a may not provide sufficient positional accuracy for particular applications (e.g., lane detection, autonomous driving, etc.). The relative position data 170d may be used to improve the accuracy of the position coordinates 170a. In some embodiments, the position coordinates 170a may be calculated by the filter 128 and/or a component external to the module 100. In some embodiments, the position coordinates 170a may be calculated by the GNSS module 150.

The calibration data 170b may comprise parameters (e.g., coefficients) used to transform data received from the sensors 102a-102n and/or presented to the actuators 104a-104n. The calibration data 170b may provide many sets of coefficients (e.g., one set of coefficients for each of the sensors 102a-102n and/or the actuators 104a-104n). The calibration data 170b may be updatable. For example, the calibration data 170b may store current values as coefficients for the sensors 102a-102n and/or the actuators 104a-104n and as the data from the sensors 102a-102n and/or the actuators 104a-104n drifts the module 100 may update the calibration data 170b in order to maintain accuracy. The format of the calibration data 170b may vary based on the design criteria of a particular implementation.

The time stamp/delay 170c may be used to determine an age of the vehicle position data 160, the time of flight of the signals RAA-RNN and/or the round-trip time of the signals RAA-RNN. In one example, the time stamp 170c may be used to determine if the vehicle position data 160 should be considered reliable or unreliable (e.g., data older than a pre-determined threshold amount of time may be unreliable). In one example, the time stamp 170c may be appended to the signals RAA-RNN. For example, the time stamp 170c may record a time in Coordinated Universal Time (UTC) and/or in a local time. The implementation of the time stamp 170c may be varied according to the design criteria of a particular implementation.

The relative position data 170d may be used to augment (e.g., improve) a precision of the position coordinates 170a (e.g., the GNSS position) and/or provide an independent set of position data (e.g., cooperative position information). The relative position data 170d may comprise ranging data corresponding to the relative position of the vehicle 30 (e.g., the ego vehicle) to other vehicles. The relative position data 170d may represent a cooperative position solution (e.g., CoP). The relative position data 170d may be used to account (e.g., compensate) for the local conditions that may affect an accuracy of the position coordinates 170a. The relative position data 170d may provide higher precision location information than the position coordinates 170a. The relative position data 170d may be calculated by the relative positioning module 152.

The dead reckoning data 170e may be used to store past and/or present information to determine positions traveled by the vehicle 30. For example, the dead reckoning data 170*e* may store a previously determined position of the vehicle 30 (e.g., estimated speed, estimated time of travel, estimated location, etc.). The previously determined position may be used to help determine a current position of the vehicle 30. In some embodiments, the dead reckoning data 170*e* may be determined based on data from the sensors 102*a*-102*n* of the vehicle 52 (e.g., an on-board gyroscope and/or wheel click messages). The implementation and/or the information stored to determine the dead reckoning data 170*e* may be varied according to the design criteria of a particular implementation.

Various other types of data (e.g., the other data 170*n*) may be stored as part of the vehicle position data 160. For example, the other data 170*n* may store trend information for the calibration data 170*b*. For example, the other data 170*n* may store past data values of the calibration data 170*b* and/or current data values of the calibration data 170*b*. The past and current data values of the calibration data 170*b* may be compared to determine trends used to extrapolate and/or predict potential future values for the calibration data 170*b*. For example, the trend information may be used to continue to refine the calibration data 170*b* when the module 100 is operating in a pure dead reckoning mode (e.g., the location information fails the quality check). In some embodiments, the other data 170*n* may store various coordinate systems determined using a procrusting procedure and/or multi-dimensional scaling operations.

The processor 124 may be configured to execute stored computer readable instructions (e.g., the instructions 162 stored in the memory 132). The processor 124 may perform one or more steps based on the stored instructions 162. In an example, the processor 124 may calculate the location information (e.g., based on the received signals GA-GN). In another example, one of the steps of the instructions 162 may be executed/performed by the processor 124 and may determine the relative position data 170*d* based on the signals RAA-RNN. The instructions executed and/or the order of the instructions 162 performed by the processor 124 may be varied according to the design criteria of a particular implementation.

The communication port 126 may allow the module 100 to communicate with external devices such as the sensors 102*a*-102*n* and/or the actuators 104*a*-104*n*. For example, the module 100 is shown connected to the external electronic bus 106. The communication port 126 may allow the module 100 to share the cooperative position data 170*d* with various infrastructure and/or components of the vehicle 30 (e.g., the sensors 102*a*-102*n* and/or the actuators 104*a*-104*n*). The communication port 126 may allow the module 100 to receive information from the sensors 102*a*-102*n* of the vehicle 30 (e.g., an on-board gyroscope data, wheel click messages, LIDAR, etc.). For example, information from the module 100 may be communicated to an infotainment device for display to a driver. In another example, a wireless connection (e.g., Wi-Fi, Bluetooth, cellular, etc.) to a portable computing device (e.g., a smartphone, a tablet computer, a notebook computer, a smart watch, etc.) may allow information from the module 100 to be displayed to a user. The filter 128 may be configured to perform a linear quadratic estimation. For example, the filter 128 may implement a Kalman filter. Generally, the filter 128 may operate recursively on input data to produce a statistically optimal estimate. For example, the filter 128 may be used to calculate the position coordinates 170*a* and/or estimate the accuracy of the position coordinates 170*a*. In some embodiments, the filter 128 may be implemented as a separate module. In some embodiments, the filter 128 may be implemented as part of the memory 132 (e.g., the stored instructions 162). The implementation of the filter 128 may be varied according to the design criteria of a particular implementation.

The clock 130 may be configured to determine and/or track a time. The time determined by the clock 130 may be stored as the time stamp data 170*c*. In some embodiments, the clock 130 may be configured to compare time stamps received in the signals RAA-RNN to determine a delay (e.g., a round-trip time).

The module 100 may be configured to calculate a position and/or broadcast data (e.g., via the transceiver 122 and/or the communication port 126) such as the positional coordinates 170*a*, an age of the data (e.g., when the data was last updated such as the time stamp 170*c*), the relative position data 170*d* and/or other data 170*n*. A method of communication implemented by the transceiver 122 and/or the communication port 126 and/or the type of data transmitted may be varied according to the design criteria of a particular implementation.

The module 100 may be configured as a chipset, a system on chip (SoC) and/or a discrete device. For example, the module 100 may be implemented as an electronic control unit (ECU). In some embodiments, the module 100 may be configured to calculate a position, velocity and time (PVT) solution, a relative positioning solution and/or a dead reckoning solution. In some embodiments, the module 100 may transmit received data (e.g., the signals GA-GN and/or the signals RAA-RNN) to other components external to the module 100 to perform calculations (e.g., the relative position data 170*d* may be sent to another component to determine the cooperative positioning solution). For example, PVT may be considered a bare minimum output for navigation. In some embodiments, the module 100 may comprise the GNSS chipset 150 and calculate a PVT solution and/or the dead reckoning solution. In some embodiments, the module 100 may be configured to receive a data stream that provides the PVT solution and may not determine the dead reckoning solution (e.g., the module 100 receives PVT data from an off-board component, determines the calibration data 170*b* and sends the calibration data 170*b* to an off-board component to determine the dead reckoning solution). In some embodiments, the module 100 may be configured to receive a data stream that provides the PVT solution and be configured to calculate the dead reckoning solution. The module 100 may be configured to supplement the PVT solution with the cooperative positioning solution determined based on the relative position 170*d*.

In some embodiments, the module 100 may use an external processor (e.g., an off-board processor) to perform the calculations to determine the relative position data 170*d*. In one example, the external processor may be implemented as a distributed computing service configured to scale and/or provision resources on demand (e.g., cloud computing). For example, the module 100 may receive the signals RAA-RNN and/or do range measurement, transmit the data to the cloud computing service and one or more processors of the cloud computing service may perform the calculations for generating the relative position data 170*d*. The module 100 may receive the calculations (e.g., the relative position data 170*d*) from the cloud computing service and store the data in the memory 132. In some embodiments, the instructions 162 may be stored on an external memory. The implementation of using the external components to supplement a capability of the module 100 may be varied according to the design criteria of a particular implementation.

Generally, the module 100 receives and/or determines a PVT solution, a dead reckoning solution and/or a cooperative positioning solution (e.g., CoP). The module 100 may be configured to separate and/or extract the data component of the dead reckoning data 170e, the data component of the PVT solution (e.g., the location data) and/or the relative position data 170d. In some embodiments, the instructions 162 may be executed by the processor 124 to provide responses to requests from other components of the vehicle 30. For example, a brake system of the vehicle 30 (e.g., one of the actuators 104a-104n) may request information from the module 100 before performing a particular response (e.g., to slow down).

The sensors 102a-102n may be configured to capture information from the environment surrounding the vehicle 30. The sensors 102a-102n may be vehicle sensors (e.g., speedometer, fluid sensors, temperature sensors, etc.). In some embodiments, data from the sensors 102a-102n may be used to determine the dead reckoning data 170e. In one example, the sensors 102a-102n may be various types of sensors configured to determine vehicle movement (e.g., magnetometers, accelerometers, wheel click sensors, vehicle speed sensors, gyroscopes, etc.). In another example, data from the sensors 102a-102n may be used to determine distances and/or directions traveled from a reference point. The types of sensors 102a-102n implemented may be varied according to the design criteria of a particular implementation.

The actuators 104a-104n may be components of the vehicle 30 configured to cause an action, move and/or control an aspect of the vehicle 30. For example, the actuators 104a-104n may be one or more of a braking system, a steering system, a lighting system, windshield wipers, a heating/cooling system, etc. In some embodiments, the actuators 104a-104n may be configured to respond to information received from the module 100 and/or the sensors 102a-102n. For example, if one of the actuators 104a-104n is a steering system, the steering system may receive information from the module 100 indicating that a collision with a nearby vehicle is likely and the steering system may respond by causing the vehicle 30 to change direction. The types of actuators 104a-104n implemented may be varied according to the design criteria of a particular implementation.

In some embodiments, the sensors 102a-102n and/or the actuators 104a-104n may be implemented to enable autonomous driving of the vehicle 30. For example, the sensors 102a-102n may receive and/or capture input to provide information about the nearby environment. The information captured by the sensors 102a-102n may be used by components of the vehicle 30 and/or the module 100 to perform calculations and/or make decisions. The calculations and/or decisions may determine what actions the vehicle 30 should take. The actions that the vehicle 30 should take may be converted into signals readable by the actuators 104a-104n. The actuators 104a-104n may cause the vehicle 30 to move and/or respond to the environment. For example, the module 100 may present an output that provides a relative position of the vehicle 30 to other vehicles. In some embodiments, the module 100 may provide the relative position data 170d (e.g., the cooperative positioning solution) to increase an ASIL classification of the vehicle 30. Other components may be configured to use the data provided by the module 100 to make appropriate decisions for autonomous driving. The modules 100a-100n may be configured to use round-trip time for estimating relative positions. Using round-trip time to estimate relative positions may result in a multitude of solutions (e.g., since there may be more unknowns than the number of equations). The modules 100a-100n may be configured to reliably and/or unambiguously obtain relative distances between objects (e.g., the objects 30a-30n) by means of round-trip time measurements.

The modules 100a-100n may be configured to perform a position estimation. For example, the modules 100a-100n may each comprise the transceiver 122 configured to send and/or receive the radio signals RAA-RNN. The processor 124 of each of the modules 100a-100n may be configured to repeatedly perform a number of steps according to the instructions 162. In one example, the processor 124 may execute one or more of the instructions 162 to calculate a time of flight (TOF) for the signals RAA-RNN. For example, the signals RAA-RNN may be sent pair-wise between two of the transceivers 122 (e.g., a transceiver 122 implemented by the module 100a and a transceiver 122 implemented by the module 100b). In another example, the processor 124 may execute one or more of the instructions 162 to calculate possible positions for the modules 100a-100n, which may result in many possible positions for each of the modules 100a-100n. In yet another example, the processor 124 may execute one or more of the instructions 162 to perform multi-dimensional scaling (MDS) calculations in order to obtain relative positions of the modules 100a-100n in a particular coordinate system. In some embodiments, the processor 124 may be configured to repeatedly perform a procrusting procedure (e.g., after two initial MDS calculations and between every two consecutive MDS calculations). The procrusting procedure may comprise translation, scaling and/or rotation of the particular coordinate system to generate a corrected coordinate system. For example, the procrusting procedure may be configured to determine the corrected present coordinate system such that a smallest change for the relative positions of the modules 100a-100n (e.g., the relative position data 170d) between the consecutive MDS calculations may be obtained.

In some embodiments, for each pair of the modules 100a-100n, the processor 124 may be configured to calculate time of flight as the time for one of the signals RAA-RNN to travel from the transmitting transceiver (e.g., the transceiver 122 of the module 100a) to a receiving transceiver (e.g., the transceiver 122 of the module 100b). In some embodiments, the processor 124 may be configured to calculate time of flight as the time for one of the signals RAA-RNN to travel from a transmitting transceiver to a receiving transceiver and back to the transmitting transceiver (e.g., at least one time, such that round-trip time (RTT) may be determined for each pair of the modules 100a-100n). In some embodiments, the processor 124 may be configured to calculate time of flight either with knowledge of a delay time between each re-transmission and/or by repeated transmissions that comprise time stamps generated by the different modules 100a-100n (e.g., to indicate when the signals RAA-RNN were received by each of the modules 100a-100n). The method of determining the time of flight may be varied according to the design criteria of a particular implementation.

The signals RAA-RNN may be configured to be compatible with a mobile base system protocol. In one example, the protocol implemented by the signals RAA-RNN may be a basic safety message (BSM) plus additional information. Generally, BSM type messages may broadcast similar information. The modules 100a-100n may be configured to send a small message outside of the standard BSM type message protocol. For example, the round-trip time and/or the time stamp 170c may be transmitted as part of the signals RAA-RNN but outside of the BSM message. The signals RAA-RNN may be transmitted at a pre-determined update rate. In one example, the update rate of the signals RAA-RNN may be 10 Hz (e.g., 100 ms). In some embodiments, the signals RAA-RNN may be transmitted as BSM signals via a standard service channel. For example, using the standard service channel, the signals RAA-RNN may be transmitted to a cluster head for the objects 30a-30n. If a target object is outside a range of the service channel, multihopping may be implemented (e.g., transmitting the signals RAA-RNN from a local cluster head to another cluster head and then to the target vehicle). The protocol(s) implemented by the signals RAA-RNN may be varied according to the design criteria of a particular implementation.

Figure 3:
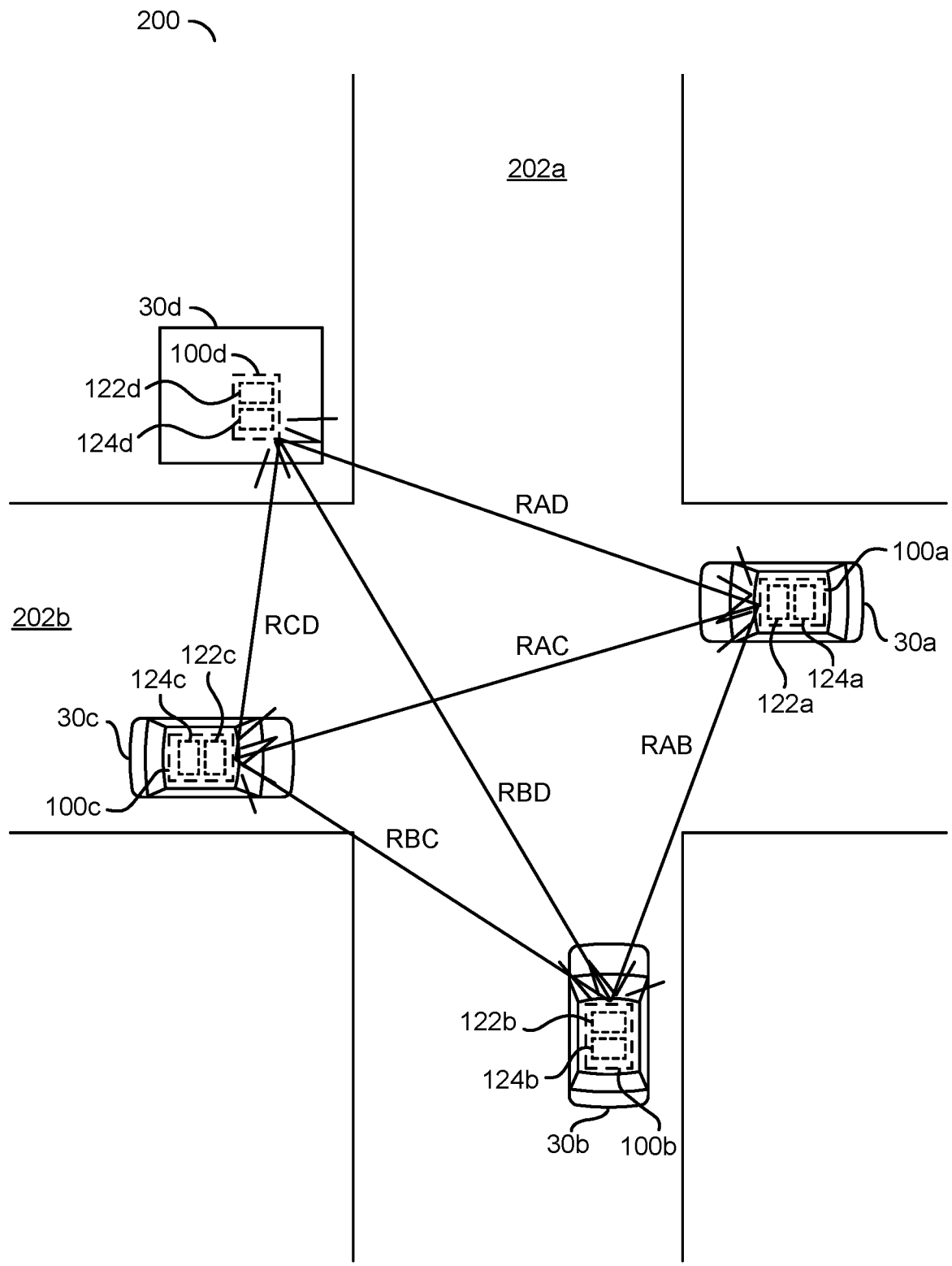
FIG. 3 is a diagram illustrating inter-vehicle range estimation.

Referring to FIG. 3 a diagram illustrating inter-vehicle range estimation is shown. An example system 200 is shown. The example system 200 may be implemented by four objects 30a-30d at an intersection of a road 202a and a road 202b. Each of the objects 30a-30d may comprise a corresponding one of the modules 100a-100d. In the example system 200, the objects 30a-30c may be vehicles and the object 30d may be infrastructure (e.g., a cell phone tower, a traffic sign, a traffic light, part of a building, etc.). On the vehicle 30a, the transceiver 122a and the processor 124a are shown. Similarly, the objects 30b-30d may comprise transceivers 122b-122d and/or processors 124b-124d. Generally, the example system 200 comprises four of the modules 100a-100n. However, the number of the modules 100a-100n may be varied according to the design criteria of a particular implementation.

In the example system 200, the modules 100a-100d may communicate between at least two other of the modules 100a-100d. The signal RAB is shown being transmitted between the vehicle 30a and the vehicle 30b, the signal RAC is shown being transmitted between the vehicle 30a and the vehicle 30c, the signal RAD is shown being transmitted between the vehicle 30a and the object 30d, the signal RBC is shown being transmitted between the vehicle 30b and the vehicle 30c, the signal RBD is shown being transmitted between the vehicle 30b and the object 30d, and the signal RCD is shown being transmitted between the vehicle 30c and the object 30d. The signals RAA-RNN may be transmitted simultaneously, in a particular order, in response to one of the signals RAA-RNN and/or periodically. The signals RAA-RNN may be transmitted back and forth between each of the modules 100a-100n.

In some embodiments, each of the modules 100a-100d may be configured to calculate the round-trip time for each of the signals RAB-RCD sent between each of the modules 100a-100d. For example, the module 100a may be configured to calculate the round-trip time for each of the signals RAB-RAD sent from the module 100a to the other modules 100b-100d, as well as the round-trip times for the signals RAB, RBC and/or RBD sent by the module 100b to the other modules 100a, 100c and/or 100d, the signals RAC, RBC and/or RCD sent by the module 100c to the other modules 100a, 100b and/or 100d and/or the signals RAD, RBD and/or RCD sent by the module 100d to the other modules 100a-100c. Using the calculated round-trip times, each of the processing units 124a-124d may be configured to calculate possible positions for the modules 100a-100d (and the objects 30a-30d), which may result in multiple possible positions for each of the modules 100a-100d (e.g., since there are more unknowns than the number of equations).

In some embodiments, the modules 100a-100d may be configured to calculate a time of flight (TOF) (e.g., pairwise) between two of the modules (e.g., 100a-100b) among the modules 100a-100d, one or more times. In one example, for each pair of the modules 100a-100d, the processors 124a-124d may be configured to determine the time of travel of the signals RAB-RCD from a transmitting one of the modules 100a-100d to a receiving one of the modules 100a-100d (e.g., a time of travel of the signal RAB from the transmitting module 100a to the receiving module 100b). To determine the time of travel (e.g., for time of flight), the modules 100a-100d may have synchronized clocks (e.g., the clocks 130 may be synchronized). In another example, for each pair of the modules 100a-100d, the processors 124a-124d may be configured to determine the round-trip time of travel of the signals RAB-RCD from a transmitting one of the modules 100a-100d to a receiving one of the modules 100a-100d and back to the transmitting one of the modules 100a-100d (e.g., a time of travel of the signal RBC from the transmitting module 100b to the receiving module 100c and back to the transmitting module 100b from the receiving module 100c, possibly including a delay time). To determine the time of travel (e.g., for round-trip time), the clocks 130 may not need to be synchronized, but the delay 170c may be known. If the delay time 170c is not known, repeated transmissions may be implemented (e.g., with 5 time stamps at the different modules 100a-100d).

Each of the processors 124a-124d may determine the possible positions for the modules 100a-100d. The processors 124a-124d may be configured to perform a multi-dimensional scaling (MDS) operation. The MDS operation may be implemented to calculate relative positions of the modules 100a-100d in a coordinate system. The processors 124a-124d may be configured to perform another MDS operation (e.g., at a later time). The MDS operation may be implemented to calculate another set of relative positions of the modules 100a-100d in another coordinate system. For example, a first MDS operation may determine relative positions in a first coordinate system and a second MDS operation may determine relative positions in a second coordinate system.

Each of the processors 124a-124d may be configured to perform a procrusting procedure. The procrusting procedure may comprise one or more of translation operations, scaling operations and/or rotation operations of one of the coordinate systems used by the MDS operations. The procrusting procedure may be configured to generate a corrected coordinate system. The corrected coordinate system may be implemented to determine a smallest change for the relative positions of the modules 100a-100d between the first MDS operation and the second MDS operation. The modules 100a-100d may be configured to continually perform MDS operations. For each of the following MDS operations, the procrusting procedure may be performed to generate an updated (e.g., current) corrected coordinate system.

The processors 124a-124d may be configured to continually and/or repeatedly calculate a TOF and/or RTT for the signals RAB-RCD sent between the modules 100a-100d, calculate possible positions for the modules 100a-100d (e.g., which may result in numerous possible positions for each of the modules 100a-100d), and/or perform MDS operations in order to obtain relative positions of the modules 100a-100d in a coordinate system. After two initial MDS operations, the processors 124a-124d may be configured to repeatedly perform a procrusting procedure between MDS calculations. In one example, the procrusting procedure may be performed between every two consecutive MDS calculations. The procrusting procedures may generate the corrected coordinate system (e.g., corresponding to the current location of the vehicles 30a-30d). In one example, the procrusting procedure may be performed using a Maximum Likelihood Estimation (MLE) computation. In another example, the procrusting procedure may be performed using a Least Squares Estimation (LSE) computation. In some embodiments, vehicle dynamics comprising gyro data, acceleration data and/or velocity data (e.g., data from the sensors 102*a*-102*n*, the dead reckoning data 170*d* and/or the position coordinates 170*a*) may be used by the processors 124*a*-124*d* (e.g., to enhance the accuracy of the calculated solution).

The modules 100*a*-100*d* may be connected to a warning and/or information device (e.g., a heads up display, an infotainment unit, an audio system, etc.) implemented in a corresponding one of the objects 30*a*-30*d*. For example, the warning and/or information device may be configured to send a notification and/or alert to the driver of a vehicle based on the cooperative positioning data calculated by the modules 100*a*-100*d* (e.g., a warning if a collision is likely). In some embodiments, the modules 100*a*-100*d* may be configured to communicate (e.g., via the electronic bus 106) to other vehicle environment detection devices (e.g., the sensors 102*a*-102*n*). For example, the sensors 102*a*-102*n* may comprise devices (e.g., radar devices, camera devices, LIDAR devices, etc.) configured to determine a position of one of the objects 30*a*-30*d*.

In some embodiments, the objects 30*a*-30*d* may not each implement one of the modules 100*a*-100*d*. For example, the vehicle 30*a* may implement the module 100*a*-100*d* and the objects 30*b*-30*d* may implement the transceivers 122*b*-122*d*. Implementing the transceivers 122*b*-122*d* without the modules 122*b*-122*d* may enable the objects 30*b*-30*d* to communicate the signals RAB-RCD but the calculations for the cooperative positioning solution may be performed by the module 100*a*. For example, the module 100*a* may determine the cooperative position solution from the signals RAB-RCD and send the data to each of the transceivers 122*b*-122*d* to provide the cooperative position solution to the other objects 30*b*-30*d*.

In some embodiments, in order to acquire an estimate of the relative position data 170*d* of the modules 100*a*-100*d* within an acceptable tolerance, the processors 124*a*-124*d* may be configured to repeatedly perform at least five procrusting procedures with intermediate MDS calculations. In some embodiments, the processors 124*a*-124*d* may be configured to calculate time of flight either with knowledge of a delay time between each re-transmission and/or by repeated transmissions with time stamps at the different transceivers.

To determine the relative positions of the modules 100*a*-100*d*, the MDS operations may be performed. The output generated in response to the MDS operations may present a true relative position between the objects 30*a*-30*d*. The procrusting procedure may be configured to rotate (e.g., rotating an X-Y diagram) the relative positioning (e.g., mirrored and/or translated) to provide additional compensation. The additional compensation performed by the procrusting procedure may provide a correct relative positioning (e.g., the relative position data 170*d*).

In the example shown, four objects (e.g., 30*a*-30*d*) are shown transmitting the signals RAB-RCD. The number of signals and/or objects may be varied according to the design criteria of a particular implementation. Increasing the number of objects (e.g., 30*a*-30*n*) may improve an accuracy of the cooperative positioning solution calculated at the cost of computational efficiency. Decreasing the number of objects (e.g., less than four of the objects 30*a*-30*d*) may decrease a computational cost but may not provide sufficient accuracy (e.g., the accuracy of the cooperative positioning solution may not be an improvement over a GNSS solution). Generally, determining a cooperative positioning solution using four of the objects 30*a*-30*n* may provide a balanced tradeoff between an accuracy of the relative positioning coordinates 170*d* and the computational processing power of the processor 124. For example, using more than four of the objects 30*a*-30*n* may provide diminishing returns on the accuracy of the relative positioning coordinates 170*d*.

In some embodiments, the modules 100*a*-100*d* may be configured to predict a trajectory (e.g., path) of the objects 30*a*-30*d*. The modules 100*a*-100*d* may calculate and/or receive an associated location and/or velocity (e.g., a low accuracy position, speed and/or heading) for each of the objects 30*a*-30*d*. In one example, the predicted trajectory may be calculated using the GPS heading and/or GPS speed information. In another example, the predicted trajectory may be calculated using the time of flight and/or round-trip time information. In yet another example, the predicted trajectory may be calculated based on the shape and/or path of the roads 202*a*-202*b*. In still another example, one or more of the objects 30*a*-30*d* may not have a predicted trajectory and/or have a null value for the predicted trajectory (e.g., the object 30*d* may be stationary). The predicted trajectory may be communicated to/from the modules 100*a*-100*d* as data messages using the signals RAB-RCD and/or stored in the memory 132.

Figure 4:
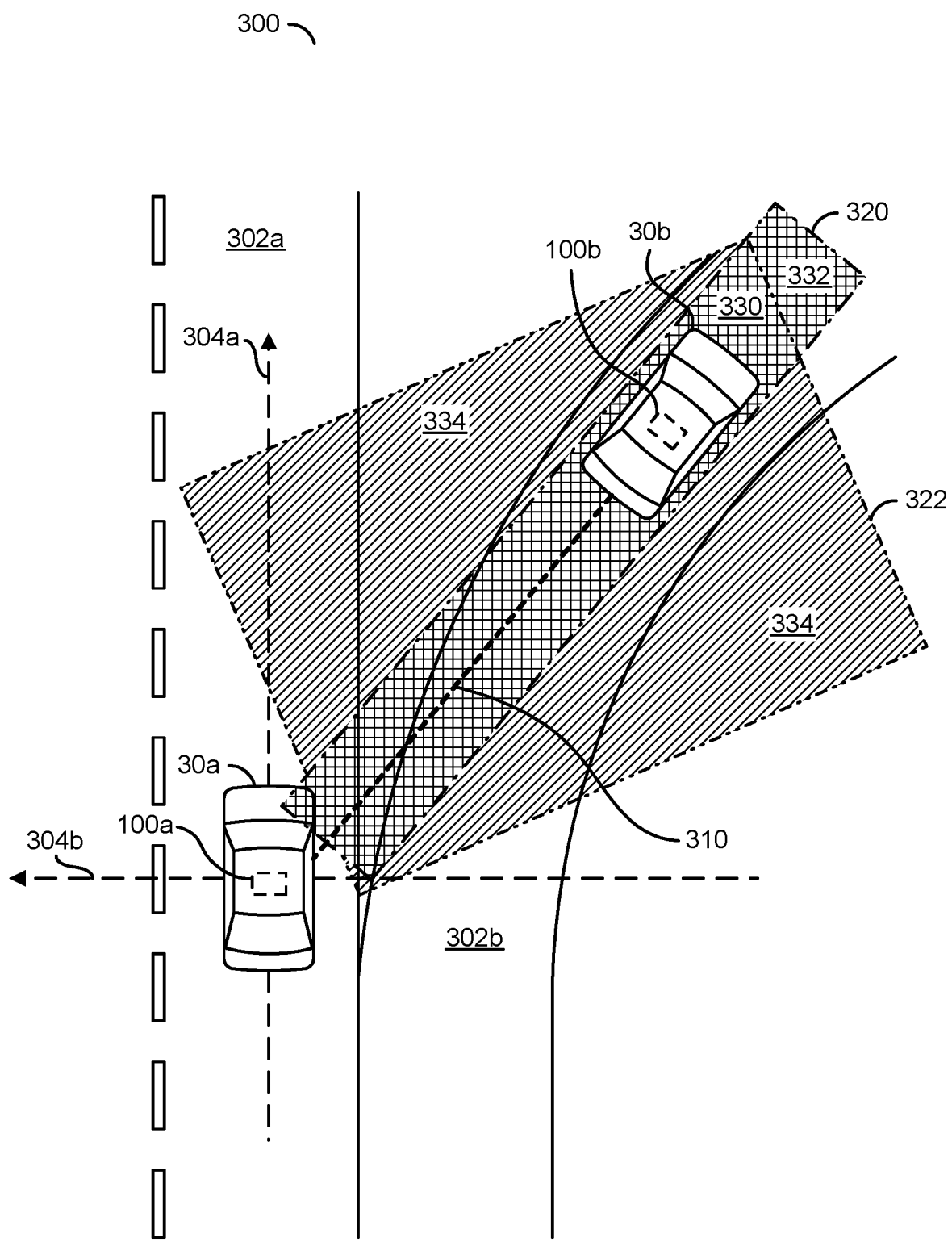
FIG. 4 is a diagram illustrating an example measurement scenario of a first region and a second region overlapping.

Referring to FIG. 4, a diagram illustrating an example measurement scenario 300 of an overlapping first region and second region is shown. Roads 302*a*-302*b* are shown. In an example, the road 302*a* may be a freeway (or highway or expressway) and the road 302*b* may be an off-ramp for the road 302*a*. Vehicles 30*a*-30*b* are shown. The vehicle 30*a* may be traveling on the road 302*a*. The vehicle 30*b* may be traveling on the road 302*b*. The arrangement of the vehicles 30*a*-30*b* and/or the roads 302*a*-302*b* may be varied according to the design criteria of a particular implementation. Each of the vehicles 30*a*-30*b* may implement a respective one of the modules 100*a*-100*b*. In some embodiments, only one of the vehicles (e.g., 30*a*) may implement the module (e.g., 100*a*) and the other vehicle (e.g., 30*b*) may implement a transceiver (e.g., 122*b*). In an example, the module 100*a* may transmit one or more of the signals RAA-RNN to the transceiver 122*b* (and other nearby transceivers to calculate the cooperative position solution with sufficient accuracy), calculate the relative position data 170*d* and transmit the relative position data 170*d* to any of the vehicles 30*b*-30*n* that are not capable of calculating the cooperative position solution. In some embodiments, the module 100*a* may receive one or more of the signals RAA-RNN and transmit the data messages to a cloud computing service and the cloud computing service may calculate the cooperative position solution. The method for calculating and/or communicating the cooperative position solution may be varied according to the design criteria of a particular implementation.

Lines 304*a*-304*b* are shown. The lines 304*a*-304*b* may represent axes with respect to the module 100*a* (e.g., the module 100*a* may represent a location of the vehicle 30*a*). For example, the axis 304*a* may represent a direction along the road 302*a* and the axis 304*b* may represent a direction perpendicular to the road 302*a*. A line 310 is shown. The line 310 may represent a direct line (e.g., as the crow flies and/or without accounting for the roadways) from the vehicle 30*a* to the vehicle 30*b*. The line 310 may extend from a location where the axes 304*a*-304*b* meet (e.g., at the module 100*a*). The line 310 may represent a true track from the vehicle 30*a* to the vehicle 30*b*. For example, the line 310 may represent a distance and a direction of the true track.

A region 320 is shown. The region 320 may represent a measurement determined using the relative position data 170*d*. In the example shown, the region 320 may generally correspond with the true track line 310. The cooperative position solution may result in an amount of error (e.g., an uncertainty of the solution). The region 320 may represent a cooperative position solution that provides a range a possible values (e.g., positions and/or data points) within a tolerance of the true track line 310. The region 320 may represent a cooperative position solution uncertainty region. In one example, the position values in the region 320 may be latitude and longitude data points. In another example, the position values in the region 320 may be X and Y coordinates. The region 320 may provide one independent measurement of the position of the vehicles 30*a*-30*n*. The region 320 may target the relative position over time.

A region 322 is shown. The region 322 may represent a measurement determined using the position coordinates 170*a*. In the example shown, the region 322 may generally correspond with the true track line 310. The GPS and/or GNSS solution may result in an amount of error (e.g., an uncertainty of the solution). The region 322 may represent a GPS and/or GNSS solution that provides a range a possible values (e.g., positions and/or data points) within a tolerance of the true track line 310. The region 322 may represent a GPS/GNSS position solution uncertainty region. In one example, the position values in the region 322 may be latitude and longitude data points. In another example, the position values in the region 322 may be X and Y coordinates. The region 322 may provide one independent measurement of the position of the vehicles 30*a*-30*n*.

Both the cooperative position solution (e.g., indicated by the region 320) and the GPS and/or GNSS solution (e.g., indicated by the region 322) may provide an independent measurement of positioning of the vehicles 30*a*-30*n* having an amount of error. Generally, the error of the cooperative position solution is smaller than the error of the GPS and/or GNSS solution. In the example shown, the region 320 has a range that is closer to the true track line 310 than the region 322 (e.g., the region 322 is larger than the region 320).

A section 330 and a section 332 are shown within the region 320. A section 334 is shown within the region 322. The section 330 may represent an amount of overlap between the region 320 and the region 322. For example, the overlap section 330 may represent data points of the cooperative position solution that match data points of the GPS and/or GNSS solution. The section 330 may indicate a verification of two independently calculated position measurements. The section 332 may represent an amount of the region 320 that does not overlap the region 322. The section 334 may represent an amount of the region 322 that does not overlap the region 320. For example, the section 332 and/or the section 334 may represent data points of the cooperative position solution and the GPS and/or GNSS solution that do not match each other. The sections 332 and/or the sections 334 may indicate portions of independently calculated position measurements that have not been verified by another measurement.

The modules 100*a*-100*n* may be configured to provide data for increasing an ASIL-classification by generating and/or comparing two independent measurements (e.g., the cooperative positioning solution and the GPS/GNSS solution). To increase an ASIL-classification, there may need to be two independent measurements of the same parameter. The modules 100*a*-100*n* may be configured to provide two independent measurements of the position parameter. The section 330 may represent the two independent, verified position parameters. For example, having the two independent measurements sufficiently overlap may increase a confidence level of the positional accuracy of the vehicles 30*a*-30*n*.

The modules 100*a*-100*n* may consider only the portion of the regions 320 and/or 322 that overlap each other. For example, the overlap section may be the only target positions (e.g., data points) that may be accepted. If the region 320 and the region 322 do not overlap then the data may not be reliable. Unreliable position data may be discarded (e.g., indicating a bad measurement due to environmental factors, that an error has been made in a calculation, an improperly calibrated sensor, etc.). In one example, only the position information (e.g., data points) related to the overlapping section 330 may be considered for possible automatic responses (e.g., safety warnings/activations).

An increased ASIL-classification may be implemented when there is a sufficient amount of overlap between the region 320 and the region 322 (e.g., the section 330). The amount (e.g., size) of the section 330 to conclude that a sufficient amount of overlap has been achieved may be a pre-determined value. In one example, the pre-determined amount may be set by industry standards. In another example, the amount of overlap may be set by regulations. Generally, the sufficient amount of overlap may be an amount that provides enough evidence to conclude that the relative position data 170*d* has been calculated correctly. The amount of overlap for improving the ASIL-classification and/or verifying the cooperative position solution calculated may be varied according to the design criteria of a particular implementation.

In some embodiments, the ASIL-classification may only be increased for the data points in the overlapping section 330. For example, some of the relative position data points may be increased (e.g., the data points that can be verified using the GPS/GNSS solution) and some of the relative position data points may not be increased. Once the relative position data 170*d* has been calculated and verified, the relative position data 170*d* may be utilized by the components of the vehicles 30*a*-30*n* (e.g., the sensors 102*a*-102*n* and/or the actuators 104*a*-104*n*). For example, the relative position data 170*d* may provide a greater precision of positioning of the vehicles 30*a*-30*n* and, once verified, the data may be utilized (e.g., autonomous responses, calibration, safety measures, traffic information, etc.). In the example shown, the uncertainty of the GPS and/or GNSS position solution may cause the vehicle 30*b* to be detected as being on the same road 302*a* as the vehicle 30*a* instead of correctly detecting the vehicle 30*b* on the off-ramp 302*b*. Using the verified data generated by the module 100*a*-100*n*, a navigation system may make adjustments faster (e.g., GPS and/or GNSS may have a slower update frequency and/or worse accuracy for map matching for navigation). The modules 100*a*-100*n* may be configured to implement data fusion for determining the position of the vehicles 30*a*-30*n* and/or providing 360-degree awareness near the vehicles 30*a*-30*n*.

In some embodiments, when the relative position coordinates 170*d* have been verified using the GPS/GNSS solution, the verified position data may be used to calibrate the sensors 102*a*-102*n* and/or the actuators 104*a*-104*n*. Data from the sensors 102*a*-102*n* and/or output from the actuators 104*a*-104*n* may become less accurate over time (e.g., sensor information drift). For example, if data from the sensors 102*a*-102*n* is unreliable then accuracy of the dead reckoning data 170*e* may become unreliable. The apparatus 100 may be configured to calibrate data received from the sensors 102a-102n when the relative position coordinates 170d have been verified. The apparatus 100 may determine calibration parameters (e.g., coefficients) to transform data received from the sensors 102a-102n to compensate for sensor information drift and/or transform output generated by the actuators 104a-104n to compensate for errors. The calibration applied may be varied according to the design criteria of a particular implementation.

In one example, calibration may be performed when the location information is within an acceptable tolerance (e.g., when the overlap between the region 320 and the region 322 is sufficient to serve as a positional reference for the sensor-based vehicle movement positional computations). In some embodiments, the modules 100a-100n may be configured to monitor trends based on data gathered on the calibration coefficients during times where there is an acceptable amount of the overlap 330. The trends may be monitored by the modules 100a-100n to perform predictive (e.g., extrapolated) adjustments of the calibration parameters when operating at times where there is an unacceptable tolerance.

For example, the modules 100a-100n may establish a set of coefficients related to input from the gyroscope sensor (e.g., the sensor 102i). The modules 100a-100n may continually (or continuously, or periodically) refine the set of coefficients for the gyroscope sensor 102i when the amount of the overlap 330 is within the acceptable tolerance. The refinement of the set of coefficients for the gyroscope sensor 102i may establish a trend that may be expected to continue based on vehicle and/or environmental characteristics in the absence of a sufficient amount of the overlap 330 (e.g., during times when there is an unacceptable tolerance). The implementation of the trend monitoring and/or extrapolation performed by the modules 100a-100n may be varied according to the design criteria of a particular implementation.

Figure 5:
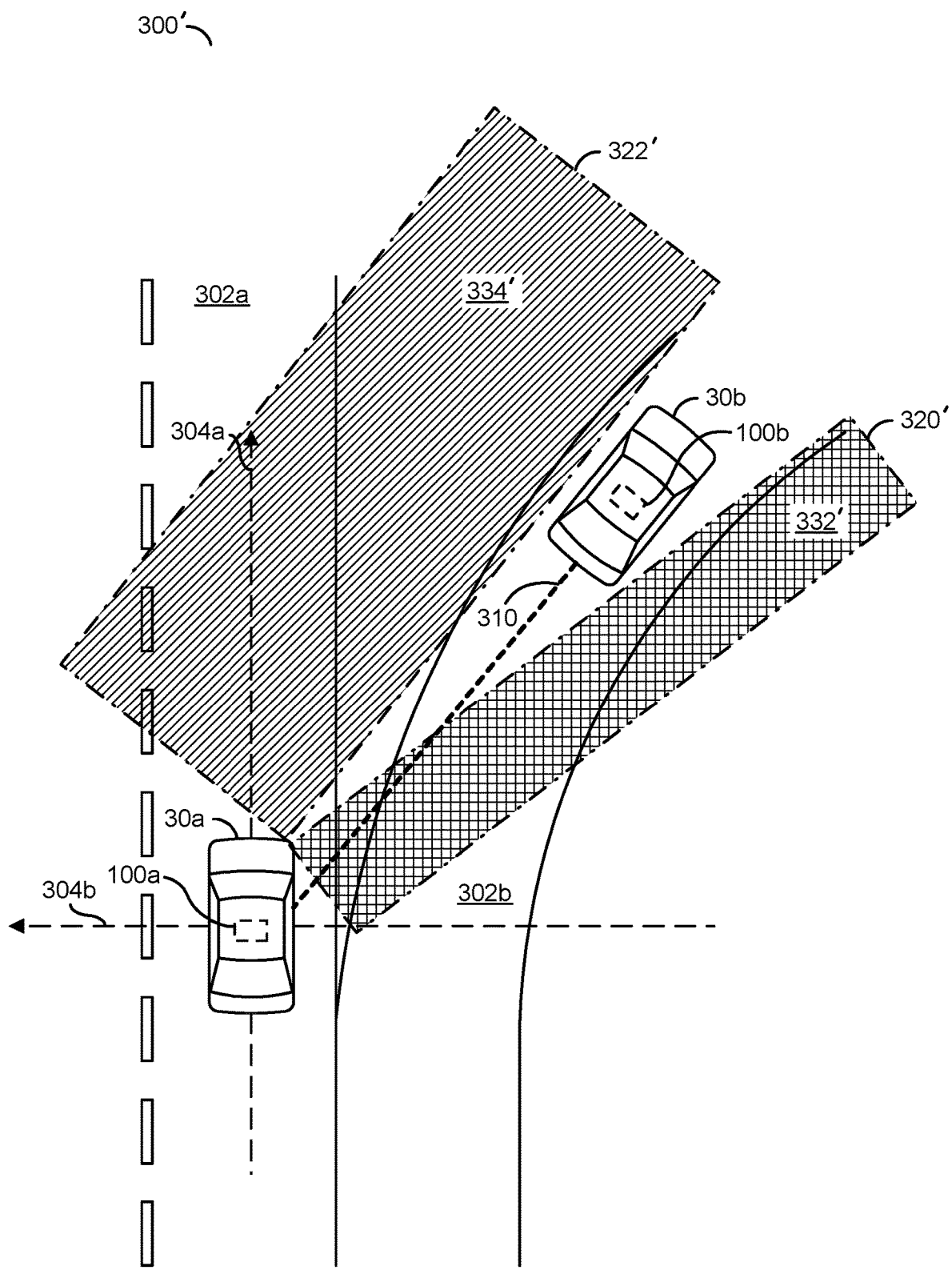
FIG. 5 is a diagram illustrating an example measurement scenario of a first region and a second region with insufficient overlap.

Referring to FIG. 5, a diagram illustrating an example measurement scenario 300' of a first region and a second region with insufficient overlap is shown. Roads 302a-302b are shown. The vehicle 30a may be traveling on the road 302a. The vehicle 30b may be traveling on the road 302b. The arrangement of the vehicles 30a-30b, the roads 302a-302b, the lines 304a-304b and/or the true track line 310 in the measurement scenario 300' may be similar to the arrangement shown in the measurement scenario 300 shown in association with FIG. 4.

The region 320', representing the measurement using the relative position data 170d, is shown. The region 322', representing the measurement determined using the position coordinates 170a, is shown. In the example measurement scenario 300', the region 320' and the region 322' may not overlap (or have a small amount of overlap). The region 320' may comprise the section 332' that does not overlap with the region 322'. The region 322' may comprise the section 334' that does not overlap with the region 320. In the example measurement scenario 300', no overlapping section 330 is present (e.g., the section 330 is shown in association with FIG. 4).

In some embodiments, the region 320' and the region 322' may not overlap each other due to an error. For example, an error may cause an incorrect solution for the cooperative positioning solution (e.g., a data message transmission error, not enough of the vehicles 30a-30n to perform the calculations, vehicles moving too slowly, etc.). In another example, an error may cause an incorrect solution for the GPS and/or GNSS solution (e.g., multipath errors, urban environment, poor weather conditions, etc.). In the example shown, neither the region 320' nor the region 322' are aligned with the true track line 310 (e.g., both the cooperative position solution and the GPS/GNSS solution may be incorrect). Generally, only one of the cooperative position solution and/or the GPS/GNSS solution may be incorrect for there to be an insufficient amount of overlap of the region 320' and the region 322'.

The example measurement scenario 300' may represent an example where there is an insufficient amount of overlap (e.g., below the pre-determined threshold amount of overlap). Since there is an insufficient amount of overlap, the two independent position measurements may not be verified. For example, the precision information may be classified as unusable (e.g., non-safe). The unusable position data may be discarded and/or the confidence level may not be increased.

In some embodiments, there may be a low amount of overlap (e.g., below or right at the threshold amount of overlap) between the region 320' and the region 322'. A confidence level of the accuracy of the relative position coordinates 170d may be determined based on the amount of overlap between the region 320' and the region 322'. Since the amount of overlap may be insufficient to increase the ASIL-classification but still be potentially correct, the relative position coordinates 170d may not be discarded. For example, the cooperative position solution may be blended with other types of position tracking such as the dead reckoning data 170e. For example, the result of the relative position data 170d may be blended with the result of the GPS/GNSS solution and/or the result of the dead reckoning solution. An amount of weight applied to each solution in the blended result may be determined based on a confidence level of each solution. For example, since the relative position coordinates 170d may have a higher amount of accuracy, a greater amount of weight may be applied to the cooperative position solution in the blended solution when the confidence level of the cooperative position solution is high (but not verified).

Figure 6:
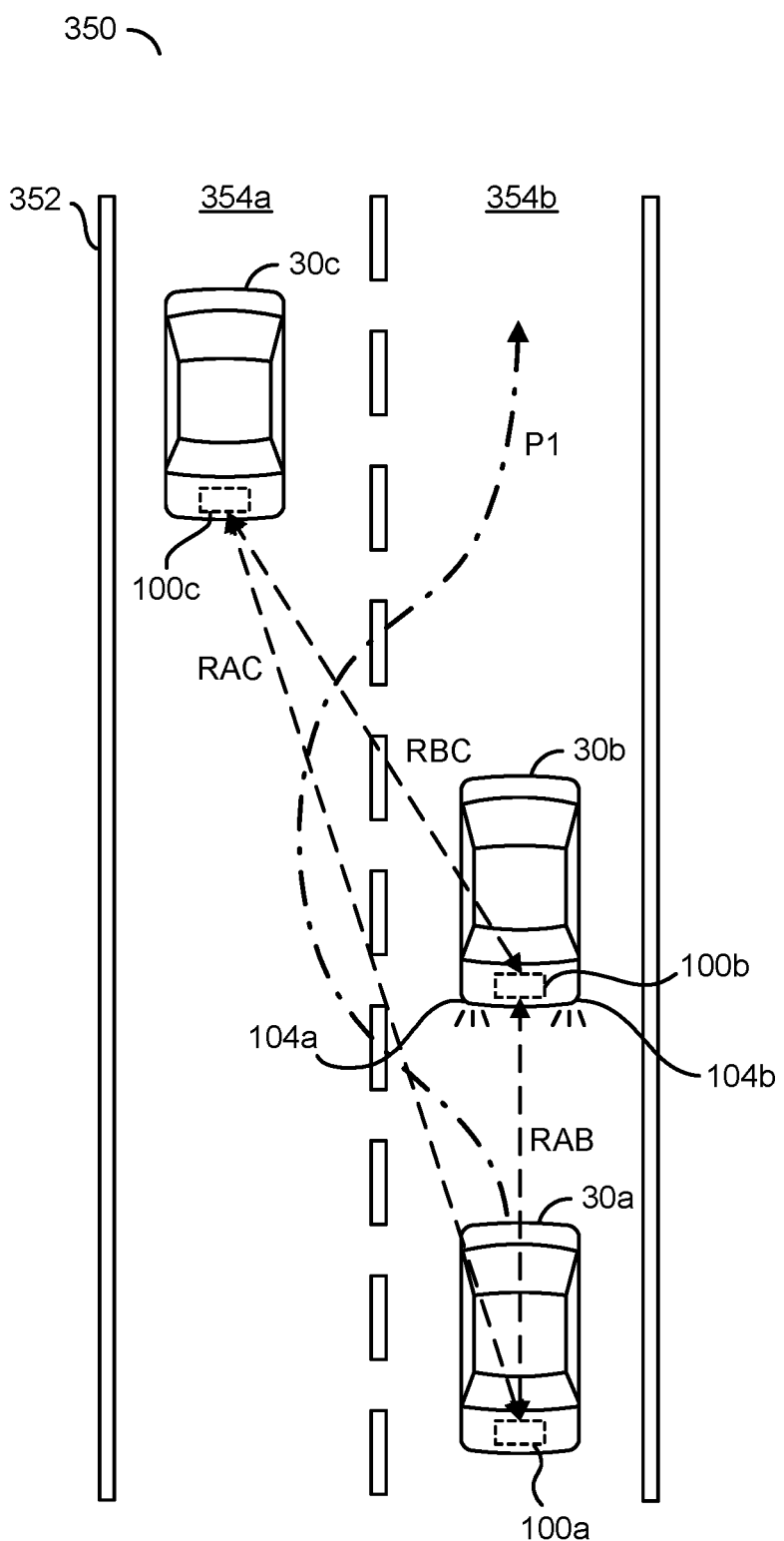
FIG. 6 is a diagram illustrating an example reversible automatic response maneuver using an improved ASIL classification.

Referring to FIG. 6, a diagram illustrating an example scenario 350 of a reversible automatic response maneuver scenario using an improved ASIL classification is shown. A road 352 is shown. The road 352 may comprise lanes 354a-354b. Vehicles 30a-30c are shown driving on the road 352. The vehicle 30c is shown in the lane 354a. The vehicles 30a-30b are shown in the lane 354b. In the example shown, the vehicles 30a-30c may be traveling in the same direction.

Each of the vehicles 30a-30c are shown comprising a respective one of the modules 100a-100c. The data message signals RAB, RAC and RBC are shown. The data messages RAB, RAC and RBC may be used to determine the relative position data 170d. Generally, more than three of the data message signals RAA-RNN are used to determine the cooperative position solution (e.g., the three vehicles 30a-30c are shown for simplicity, however at least four of the vehicles 30a-30n are used to determine the relative position data 170d).

The module 100a may determine the GPS/GNSS solution (e.g., calculate the region 322 using the signal GA) and determine the cooperative position solution (e.g., calculate the region 320) using the data message signals (e.g., RAB and RAC). The module 100a may compare the region 320 to the region 322 to determine whether the overlap section 330 has a sufficient amount of overlap (e.g., whether a pre-determined amount of the region 320 and the region 322 overlap). The module 100a may increase a confidence level of the positional accuracy (e.g., verify the cooperative position solution using the independently measured GPS/GNSS solution).

In the example scenario 350, the module 100a may determine that there is enough overlap between the cooperative position solution and the GPS/GNSS solution to raise the confidence level of the positional accuracy of the vehicles 30a-30n. The increased confidence level may be used to enable one or more automatic responses. In an example, the increased confidence level of the positional accuracy may enable an increase of the ASIL-classification for the vehicle 30a. The module 100a may enable the increase of the ASIL-classification of the vehicle 30a. In response to the increased ASIL-classification enabled by the module 100a, the vehicle 30a may perform one or more automatic responses. In some embodiments, the automatic responses may comprise active and/or passive responses. An active response may be an action by the vehicle 30a (or the components of the vehicle 30a such as the actuators 104a-104n) that affects the other vehicles 30b-30n. For example, an active response may be a movement by the vehicle 30a (e.g., accelerating, braking, changing lanes, turning, etc.). A passive response may be an action by the vehicle 30a (or the components of the vehicle 30a such as the actuators 104a-104n) that does not affect the other vehicles 30b-30n. For example, a passive response may be performed on and/or to the passengers of the vehicle 30a (e.g., airbag deployment, an audio notification, a visual notification, a blind spot warning, etc.). The types of active and/or passive responses may be varied according to the design criteria of a particular implementation.

In some embodiments, the automatic responses may comprise reversible and/or irreversible responses. A reversible response may be an action by the vehicle 30a that may be stopped and/or reverted. In an example, braking may be reversed by accelerating, changing lanes may be stopped by returning to the original position, seatbelt pre-tensioning may be loosened, a notification may be stopped, etc. An irreversible response may be an action by the vehicle 30a that may not be stopped and/or reverted. In an example, driving down a one-way street, driving down an off-ramp/on-ramp, deploying an airbag, etc. An irreversible response may have some degree of correction, but may be time-consuming and/or resource-consuming to correct. For example, turning onto a different street may be considered an irreversible action because to correct the response, the vehicle may have to find a safe place to turn around to correct the action. The types of reversible and/or irreversible responses may be varied according to the design criteria of a particular implementation.

A path P1 is shown. The path P1 may represent an automatic response by the vehicle 30a performed in response to an increase of the confidence level of the position parameter. The path P1 may be an example active response by the vehicle 30a. The path P1 may be an example reversible response by the vehicle 30a. When performing a maneuver such as following the path P1, a high degree of accuracy and/or confidence in the position of the vehicles 30a-30c may be needed. For example, as the vehicle 30a follows the path P1, the vehicle 30a may appear and/or disappear from the field of view of the other vehicles 30b-30c (e.g., out of the view of the drivers and/or out of range of the sensors 102a-102n). The modules 100a-100c may enable a full 360 degree awareness for each of the vehicles 30a-30c.

In the example scenario 350, the vehicle 30b may be slowing down (e.g., the actuators 104a-104b may represent activated brake lights of the vehicle 30b). The automatic response of the vehicle 30a may be to pass the vehicle 30b. The path P1 of the automatic response of the vehicle 30a may be to change from the lane 354b to the lane 354a to avoid the vehicle 30b. Since the vehicle 30c is in the lane 354a, the automatic response of the vehicle 30a may be to return to the lane 354b once in front of the vehicle 30b. In an example, the data messages RAC and/or the cooperative position solution may indicate that the vehicle 30c is accelerating, which may leave enough room for the vehicle 30a to return to the lane 354b after passing the vehicle 30b.

In the example shown, the automatic response using the path P1 may be reversible by returning to the lane 354b without passing the vehicle 30b. For example, if another vehicle (not shown) located behind the vehicle 30a is speeding in the lane 354a, the vehicle 30a may determine a better response is to remain in the lane 354b. In the example shown, the automatic response using the path P1 may be an active response since the other vehicles 30b and 30c (and other vehicles 30d-30n not shown) may be affected by the vehicle 30a changing lanes. For example, the vehicle 30c may accelerate to make enough room for the vehicle 30a to move in front of the vehicle 30b.

Figure 7:
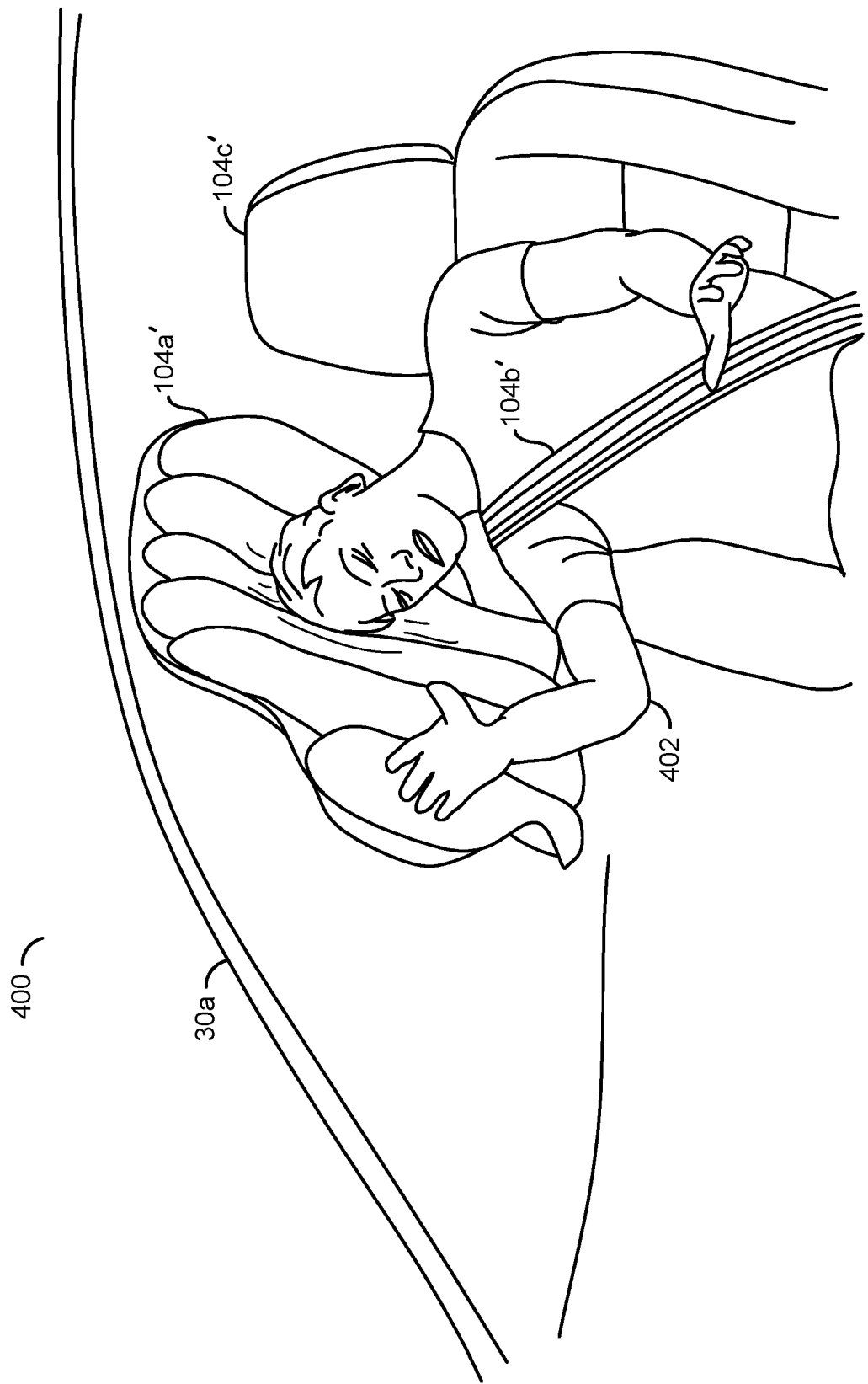
FIG. 7 is a diagram illustrating an example irreversible automatic response using an improved ASIL classification.

Referring to FIG. 7, a diagram illustrating an example scenario 400 of an irreversible automatic response using an improved ASIL classification is shown. A passenger 402 may be in the vehicle 30a. In the example scenario 400, the passenger 402 may be in a collision (e.g., a side impact).

Actuators 104a'-104c' are shown in the vehicle 30a. The actuator 104a' may implement a side airbag. The actuator 104b' may be a seatbelt. The actuator 104c' may be a car seat. For illustrative purposes, the actuators 104a'-104c' may be shown as components of the vehicle (e.g., the airbag, the seatbelt and/or the seat). However, the actuators 104a'-104c' may be controlling mechanisms (e.g., electronic control devices and/or mechanical control devices) configured to cause the components of the vehicle 30a to perform an action.

The actuators 104a'-104c' may be examples of passive automatic responses. In an example, the airbag 104a' may be deployed when a crash is imminent (e.g., pre-deployed in response to a side impact). In another example, the seatbelt 104b' may be pre-tensioned when a crash is expected. In yet another example, the seat 104c' may be adjusted to protect the passenger 402 during a collision. In some embodiments, the actuators 104a'-104c' may implement safety features. The type of automatic response performed by the actuators 104a'-104c' may be varied according to the design criteria of a particular implementation.

The airbag 104a' may be an example of an irreversible response. For example, when the airbag 104a' is deployed, the action may not be reversed and/or not reversed easily (e.g., the airbag may need to be replaced after deployment). The seatbelt 104b' may be an example of a reversible response. For example, when the seatbelt 104b' is pre-tensioned, the action may be reversed (e.g., the seatbelt may be loosened).

The modules 100a-100n may enable a reversible action before enabling an irreversible action. For example, the amount of overlap of the region 320 and the region 322 may have a higher threshold for enabling the irreversible actions. A smaller size of the overlap section 330 may be sufficient to enable a reversible action. Each of the modules 100a-100n may implement multiple thresholds of verification (or confidence levels). For example, each threshold of verification (e.g., amounts of overlap between the region 320 and the region 322) may be associated with a different automatic response. For example, before deploying the airbag 104a' a high confidence level (e.g., near certainty) of the collision may be the threshold. In another example, the confidence level of the position data for pre-tensioning the belt 104b' may be less than the confidence level for deploying the airbag 104*a*'. The modules 100*a*-100*n* may be configured to improve the ability and/or effectiveness of the automatic responses. For example, the effectiveness of the airbag 104*a*' may be increased if the airbag 104*a*' is deployed prior to the collision. In another example, the effectiveness of the seatbelt may be improved in the seatbelt 104*b*' is pre-tensioned prior to the collision. In yet another example, the ability to intervene (e.g., apply the brakes) may be improved with the improved and/or verified positioning information. The verified relative position data 170*d* may determine a collision is imminent and the modules 100*a*-100*n* may enable the automatic responses before the impact occurs.

The improved and/or verified position information generated by the modules 100*a*-100*n* may be fused with other data from the sensors 102*a*-102*n*. For example, one of the sensors 102*a*-102*n* may be a LIDAR and/or a camera to provide a computer readable field of view near the vehicle. The fusion of the data from the sensors 102*a*-102*n* and the verified relative position data 170*d* may provide a better estimation of the likelihood of an impact. For example, the modules 100*a*-100*n* (e.g., the processor 124) may be configured to receive the data from the sensors 102*a*-102*n* and/or the relative position data 170*d* to determine where on the vehicle 30*a* a collision may occur.

Using the verified relative position data 170*d* and/or sensor data readings from the sensors 102*a*-102*n*, the modules 100*a*-100*n* (e.g., the processor 124) may perform data fusion. The data fusion may aggregate the available data. Aggregating the available data (e.g., sensor fusion) may enable the processor 124 to make inferences. For example, the inferences may be determinations that may not be available using data from one of the data sources alone. The inferences may be used to provide a 360-degree awareness near the vehicles 30*a*-30*n*. The modules 100*a*-100*n* may enable a full 360-degree awareness of the objects 30*b*-30*n* near the vehicle 30*a*. For example, with the full 360-degree awareness the modules 100*a*-100*n* may be configured to distinguish between a side impact and a frontal impact and the appropriate automatic responses may be generated accordingly. Fusing the cooperative position solution with the pre-crash sensors 102*a*-102*n*, a faster and/or more effective response for enabling the automatic responses may be achieved.

Figure 8:
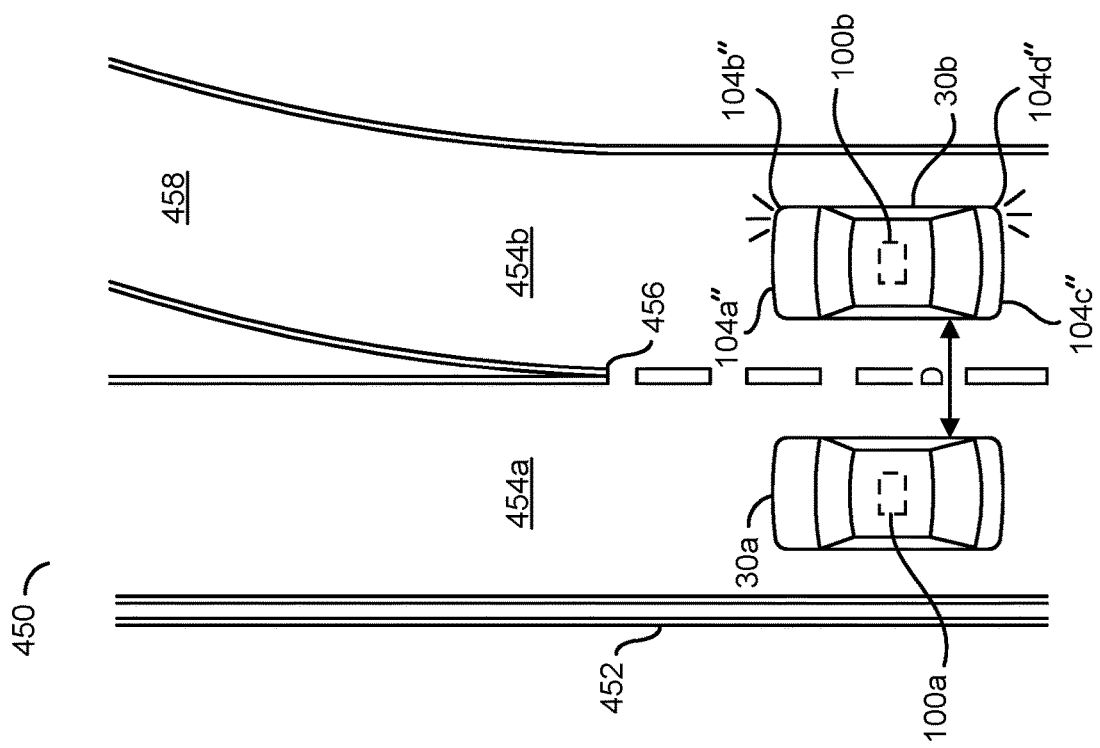
FIG. 8 is a diagram illustrating an example traffic scenario using an improved ASIL classification.

Referring to FIG. 8, a diagram illustrating an example traffic scenario 450 using an improved ASIL classification is shown. Vehicles 30*a*-30*b* may be driving on a road 352. The road 352 may have lanes 454*a*-454*b*. The road 452 may have a fork 456. After the fork 456, the lane 454*a* may continue as the road 452. After the fork 456, the lane 454*b* may continue as an off-ramp 458.

The vehicle 30*a* may be driving in the lane 454*a*. The vehicle 30*b* may be driving in the lane 454*b*. The vehicles 30*a*-30*b* may be approaching the fork 456. Each of the vehicles 30*a*-30*b* may implement a respective one of the modules 100*a*-100*b*. On the vehicle 30*b*, the indicators 104*b*" and 104*d*" are shown activated and the indicators 104*a*" and 104*c*" are shown off, which may indicate that the vehicle 30*b* is exiting the road 452 and will travel on the off-ramp 458.

The vehicles 30*a*-30*b* may be traveling in close proximity to each other. A distance (e.g., D) is shown between the vehicle 30*a* and the vehicle 30*b*. Using the GPS/GNSS solution alone may not provide a sufficient resolution for the position of the vehicles 30*a*-30*b*. For example, the GPS/GNSS solution may not provide sufficient accuracy to determine the position of the vehicles 30*a*-30*b* at the lane level (e.g., the resolution of the GPS/GNSS solution may be less than D). Without the verified cooperative position solution, the vehicles 30*a*-30*b* may not be able to navigate autonomously and/or receive timely notifications to enable the driver to take corrective actions.

In an example, if the vehicle 30*a* intended to take the off-ramp 458, in the traffic scenario 450, the vehicle 30*a* may need to slow down and move behind the vehicle 30*b*. The verified relative position data 170*d* may enable the vehicles 30*a*-30*b* to take a corrective action (e.g., an automatic response) to enable the vehicle 30*a* to move over to the lane 454*b* and then to the off-ramp 458. For example, the vehicle 30*b* may increase in speed and the vehicle 30*a* may slow down and change lanes.

Figure 9:
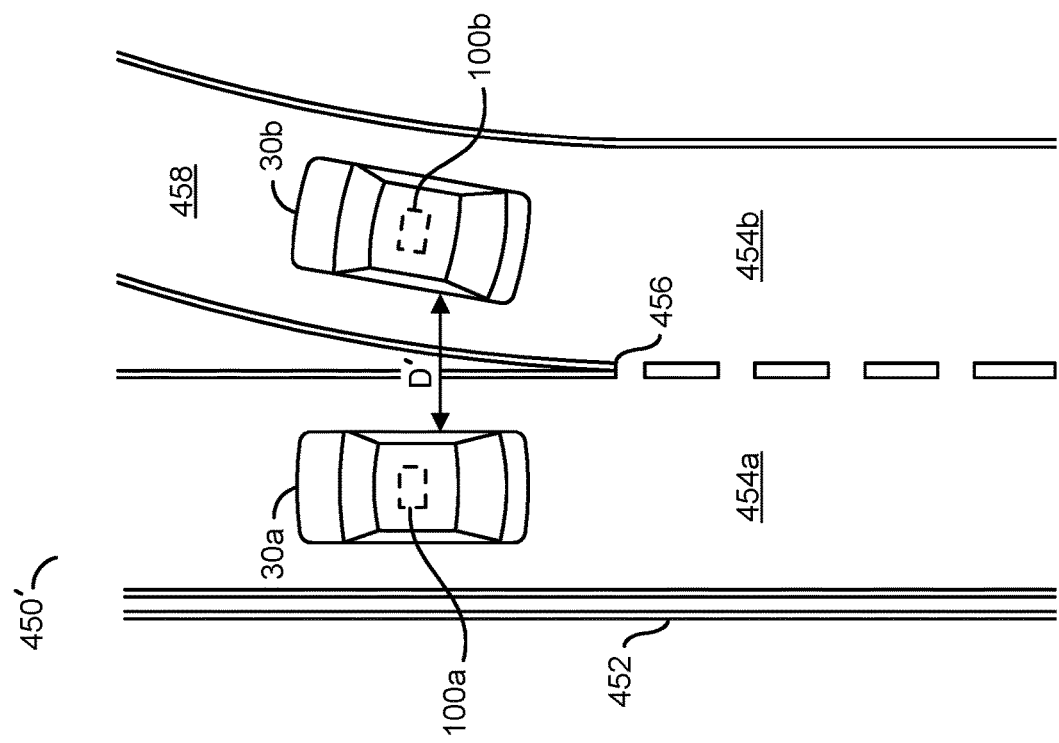
FIG. 9 is a diagram illustrating an alternate example traffic scenario using an improved ASIL classification.

Referring to FIG. 9, a diagram illustrating an alternate example traffic scenario 450' using an improved ASIL classification is shown. The vehicles 30*a*-30*b* are shown driving past the fork 456. The example traffic scenario 450' may be an example shown at a later time than the example traffic scenario 450 shown in association with FIG. 8.

The vehicle 30*a* may be in the lane 454*a* after the fork 456. For example, the vehicle 30*a* may have stayed on the road 452. The vehicle 30*b* may be on the off-ramp 458. For example, the vehicle 30*b* may have turned off from the road 452. In the example shown, the vehicles 30*a*-30*b* may be traveling on different roads (e.g., the road 452 and the off-ramp 458) yet still appear relatively close to each other.

A distance (e.g., D') is shown between the vehicle 30*a* and the vehicle 30*b*. The distance D' may be relatively similar to the distance D (shown in association with FIG. 8). For example, the distance D' may be within approximately 1 m-2 m of the distance D. Despite being on different roads and despite the vehicle 30*b* starting to travel in a different direction on the off-ramp 458, the distance D' may be approximately the same as the distance D when the vehicles 30*a*-30*b* were both traveling on the same road 452.

In some embodiments, calculating the position of the vehicles 30*a*-30*b* using the GPS/GNSS solution may not provide a sufficient amount of precision to distinguish between the distance D and the distance D'. The cooperative position solution generated using one or more of the modules 100*a*-100*n* may enable a sufficient amount of precision to distinguish between the distance D' and the distance D. The modules 100*a*-100*n* may be configured to verify the relative position data 170*d* using the GPS/GNSS solution to increase a confidence level of the positional accuracy.

In some embodiments, the relative position data 170*d* may be fused with map data (e.g., from a map service such as Google Maps, Apple Maps, Bing Maps, OpenStreetMap, etc.). Using the verified relative position data 170*d* map-matching may be improved. For example, using the map data, the position of the vehicle 30*a* may be correctly located as being on the road 452 past the fork 456. In another example, using the map data, the position of the vehicle 30*b* may be correctly located as being on the off-ramp 458.

A good set (e.g., verified) of relative position data 170*d* may be fused with other ASIL data (e.g., data from the sensors 102*a*-102*n*). In one example, the vehicle gyroscopes may be used to estimate the future expected trajectory of the vehicle 30*b* and an accurate expected (e.g., potential) path of the vehicle 30*b* may be determined using the verified relative position data 170*d*. With a verified and accurate initial position, the expected trajectory of the vehicle 30*b* may be determined. The verified relative position data 170*d* may prevent false negatives and/or false positives (e.g., for collision detection). For example, verified relative position data 170*d* may be a part of a data set used for ASIL determinations. ASIL determinations may be used for proper navigation, performing driver-assist interventions (e.g., automated emergency braking), collision avoidance, impact mitigation, maneuvering in difficult circumstances, belt pre-tensioning, pre-crash side-airbag deployment prior to a side impact, pre-crash bumper-bag deployment prior to a frontal impact, active blind spot assist, external signaling (e.g., horn, hazard lights, turn indicators, etc.), automatic headlight beam control (e.g., to prevent blinding of oncoming traffic), mirror adjustment, intersection movement assist (IMA), left turn assist (LTA), forward collision warning (FCW), lane change warning (LCW), etc. The type of ASIL determinations made using the verified relative position data 170d may be varied according to the design criteria of a particular implementation. Referring to FIG. 10, a method (or process) 500 is shown.

The method 500 may increase a confidence level of positional accuracy of vehicles. The method 500 generally comprises a step (or state) 502, a step (or state) 504, a step (or state) 506, a step (or state) 508, a step (or state) 510, a step (or state) 512, a step (or state) 514, a decision step (or state) 516, a step (or state) 518, a step (or state) 520, a step (or state) 522, and a step (or state) 524.

The state 502 may start the method 500. In the state 504, the transceiver 122 (e.g., of the vehicle 30a) may receive the data messages RAA-RNN from the other vehicles (e.g., the vehicles 30b-30n). Next, in the state 506, the processor 124 (e.g., the relative positioning module 152) may calculate the relative position coordinates 170d. In the state 508, the processor 124 (e.g., the GNSS module 150) may calculate the GPS/GNSS solution from the signals GA-GN. In some embodiments, the processor 124 may receive the GPS/GNSs solution (e.g., the GPS/GNSS solution may be determined using a module and/or circuit external to the apparatus 100). Next, the method 500 may move to the state 510.

In the state 510, the processor 124 may determine the region 320 associated with the cooperative position solution (e.g., the uncertainty region for the relative position data 170d). In the state 512, the processor 124 may determine the region 322 associated with the GPS/GNSS solution (e.g., the uncertainty region for the position coordinates 170a). Next, in the state 514, the processor 124 may compare the regions. For example, the processor 124 may compare the region 320 to the region 322 to determine whether there is an overlapping section 330 and/or the amount of the overlapping section 330. Next, the method 500 may move to the decision state 516.

In the decision state 516, the processor 124 may determine whether an amount of the overlap of the regions is above a pre-determined amount (e.g., a threshold). If the amount of overlap (e.g., the size of the section 330) is not above a pre-determined threshold, the method 500 may move to the state 518. In the state 518, the processor 124 may discard the relative position data result. Next, the method 500 may move to the state 524. In the decision state 516, if the amount of overlap is above the pre-determined threshold, the method 500 may move to the state 520.

In the state 520, the processor 124 may increase a confidence level of the positional accuracy of the vehicles 30a-30n. In an example, increasing the confidence level may indicate that the relative position data 170d has been independently verified. In another example, increasing the confidence level may comprise increasing an ASIL-classification. Next, in the state 522, the processor 124 may enable automatic responses based on the confidence level. In some embodiments, the processor 124 may transmit a signal (e.g., using the electronic bus 106) indicating that the cooperative position solution has been verified and other components of the vehicle 30a may increase the ASIL-classification and/or changes modes operating according to a higher ASIL-classification. In an example, the verified relative position coordinates 170d may be provided to a sensor fusion unit of the vehicle 30a along with other sensor readings from the sensors 102a-102n for ASIL determinations. Next, the method 500 may move to the state 524. The state 524 may end the method 500.

Figure 11:
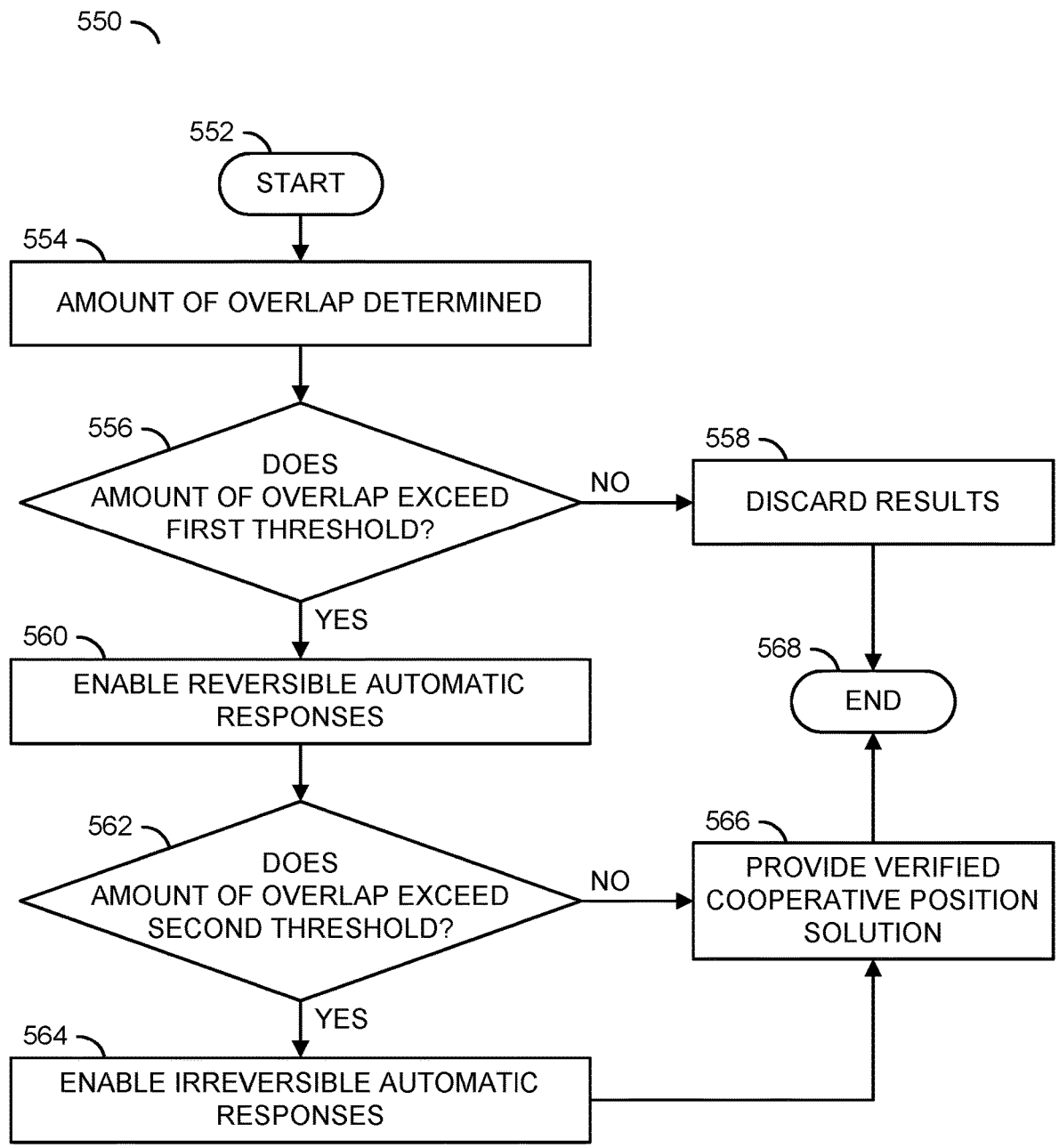
FIG. 11 is a flow diagram illustrating a method for enabling reversible and irreversible automatic responses.

Referring to FIG. 11, a method (or process) 550 is shown. The method 550 may enable reversible and irreversible automatic responses. The method 550 generally comprises a step (or state) 552, a step (or state) 554, a decision step (or state) 556, a step (or state) 558, a step (or state) 560, a decision step (or state) 562, a step (or state) 564, a step (or state) 566, and a step (or state) 568.

The state 552 may start the method 550. In the state 554, the amount of the overlap section 330 may be determined by the processor 124. Next, the method 550 may move to the decision state 556.

In the decision state 556, the processor 124 may determine whether the amount of the overlap section 330 exceeds a first threshold. If the size of the overlap section 330 does not exceed the first threshold, the method 550 may move to the state 558. In the state 558, the processor 124 may discard the cooperative position solution results and/or the GPS/GNSS solution results. Next, the method 550 may move to the state 568. In the decision state 556, if the size of the overlap section 330 does exceed the first threshold, the method 550 may move to the state 560. In the state 560, the processor 124 may enable the reversible automatic responses. Next, the method 550 may move to the decision state 562.

In the decision state 562, the processor 124 may determine whether the amount of the overlap section 330 exceeds a second threshold. For example, the second threshold may be higher than the first threshold (e.g., the size of the overlap section 330 may be larger to exceed the second threshold than to exceed the first threshold). If the size of the overlap section 330 does exceed the second threshold, the method 550 may move to the state 564. In the state 564, the processor 124 may enable the irreversible automatic responses. Next, the method 550 may move to the state 566. In the decision state 562, if the size of the overlap section 330 does not exceed the second threshold, the method 550 may move to the state 566. In the state 566, the processor 124 may provide the verified cooperative position solution. For example, the verified cooperative position solution may be provided to one or more components of the vehicle 30a (e.g., the sensors 102a-102n and/or the actuators 104a-104n). In another example, the verified cooperative position solution may be provided to a cloud service configured to process the relative position data 170d from a number of the vehicles 30a-30n. In yet another example, the verified cooperative position solution 170d may be provided to the memory 132 for storage. Next, the method 550 may move to the state 568. The state 568 may end the method 550.

Figure 12:
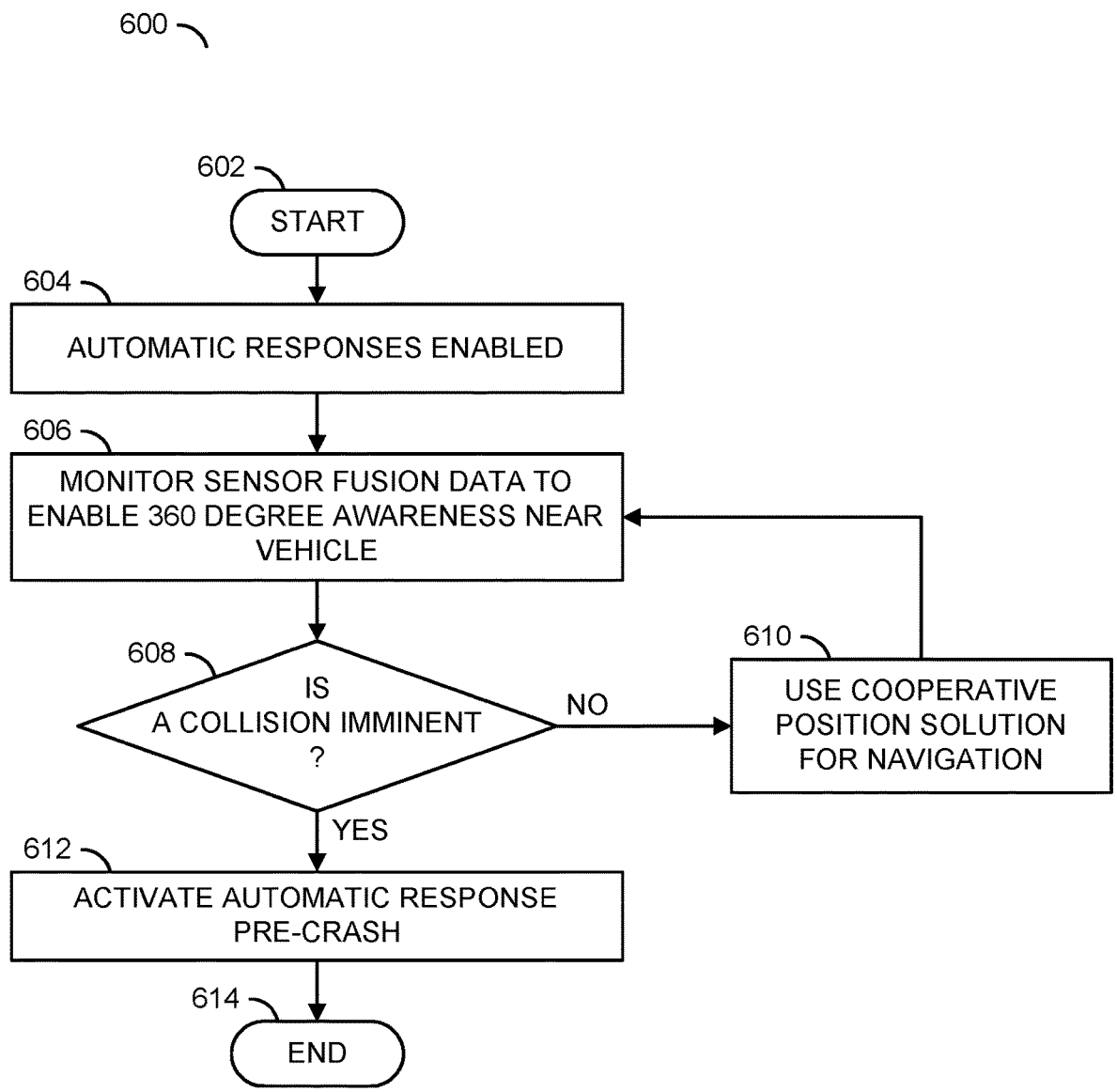
FIG. 12 is a flow diagram illustrating a method for activating an automatic pre-crash response in response to an imminent collision.

Referring to FIG. 12, a method (or process) 600 is shown. The method 600 may activate an automatic pre-crash response in response to an imminent collision. The method 600 generally comprises a step (or state) 602, a step (or state) 604, a step (or state) 606, a decision step (or state) 608, a step (or state) 610, a step (or state) 612, and a step (or state) 614.

The state 602 may start the method 600. Next, in the state 604, the automatic responses may be enabled by the processor 124 (e.g., the relative position data 170d may have been previously verified). In the state 606, the processor 124 may monitor sensor fusion data to enable 360-degree awareness near the vehicle 30a. For example, the processor 124 may receive data from the sensors 102a-102n and/or other sources of data (e.g., from cloud computing resources). The data from the sensors 102a-102n may be fused with the verified relative position data 170d to enable 360-degree awareness. Next, the method 600 may move to the decision state 608.

In the decision state 608, the processor 124 may determine whether a collision is imminent. If a collision is not imminent, the method 600 may move to the state 610. In the state 610, the processor 124 may use the cooperative position solution for navigation and/or other purposes. Next, the method 600 may return to the state 606. In the decision state 608, if a collision is imminent, the method 600 may move to the state 612. In the state 612, the processor 124 may activate the automatic response(s) pre-crash. For example, the processor 124 may use the electronic bus 106 to enable an activation of one or more of the actuators 104a-104n. Next, the method 600 may move to the state 614. The state 614 may end the method 600.

Figure 13:
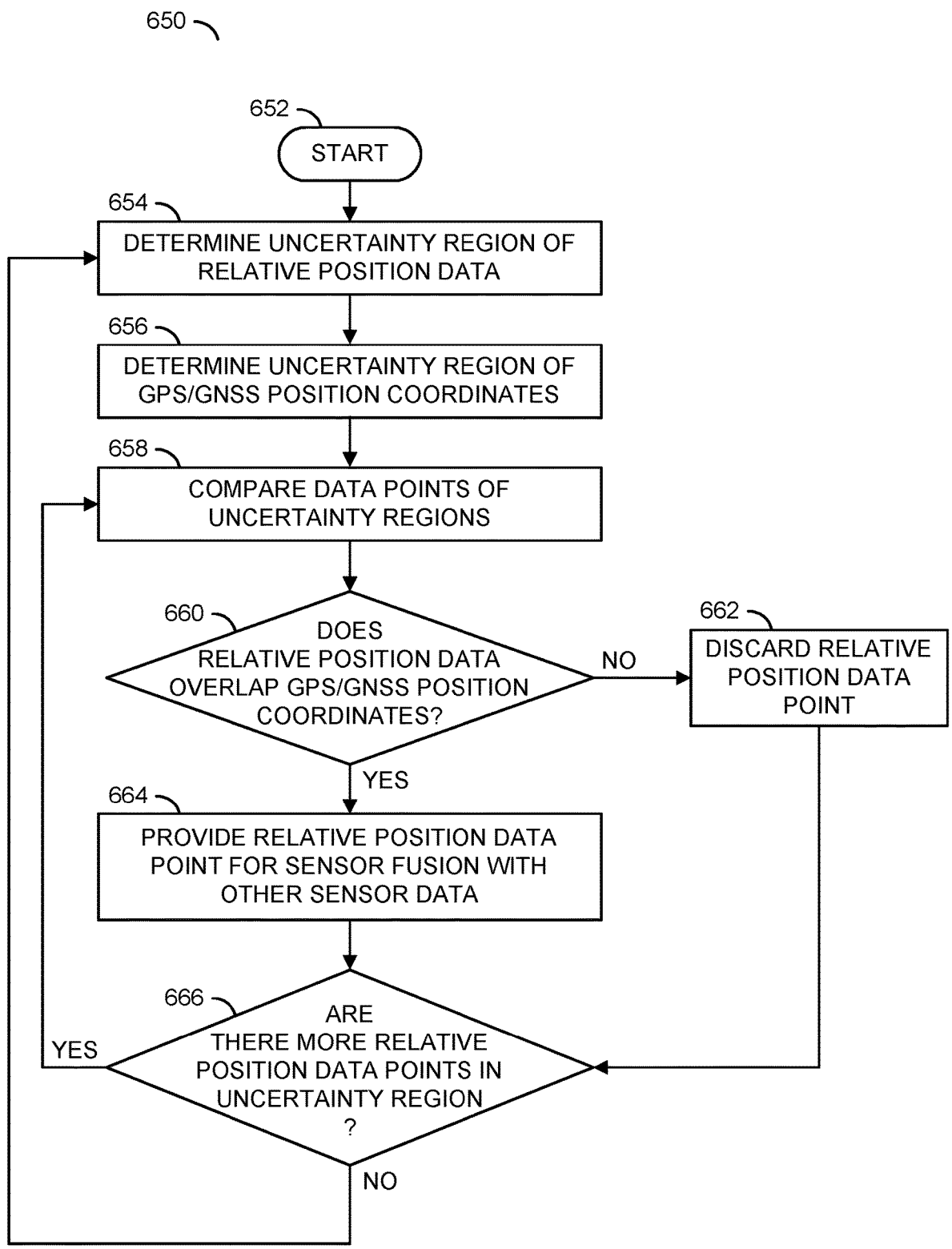
FIG. 13 is a flow diagram illustrating a method for verifying relative position data.

Referring to FIG. 13, a method (or process) 650 is shown. The method 650 may verify the relative position data 170d. The method 650 generally comprises a step (or state) 652, a step (or state) 654, a step (or state) 656, a step (or state) 658, a decision step (or state) 660, a step (or state) 662, a step (or state) 664, and a decision step (or state) 666.

The state 652 may start the method 650. In the state 654, the processor 124 (e.g., the relative positioning module 152) may determine the uncertainty region 320 of the relative position data 170d. In the state 656, the processor 124 (e.g., the GNSS module 150) may determine the uncertainty region 322 of the position coordinates 170a. Next, in the state 658, the processor 124 may compare the data points of the uncertainty region 320 to the data points of the uncertainty region 322. In one example, the data points of the uncertainty region 320 and the uncertainty region 322 may be compared in parallel and/or in series. Next, the method 650 may move to the decision state 660.

In the decision state 660, the processor 124 may determine whether the relative position data 170d overlaps the GPS/GNSS position coordinates 170a. If the relative position data 170d does not overlap any of the GPS/GNSS position coordinates 170a, the method 650 may move to the state 662. In the state 662, the processor 124 may discard the relative position data point 170d. Next, the method 650 may move to the decision state 666. In the decision state 660, if the relative position data 170d does overlap any of the GPS/GNSS position coordinates 170a, the method 650 may move to the state 664.

In the state 664, the processor 124 may provide the relative position data point 170d for sensor fusion with other sensor data. Next, the method 650 may move to the decision state 666. In the decision state 666, the processor 124 may determine whether there are more relative position data points 170d in the uncertainty region 320. If there are more relative position data points, the method 650 may return to the state 658. If there are not more relative position data points, the method 650 may return to the state 654.

The functions performed by the diagrams of FIGS. 10-13 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. An apparatus comprising:
   a transceiver configured to send/receive data messages to/from a plurality of vehicles;
   an antenna configured to receive signals from GNSS satellites; and
   a processor configured to (i) determine a first region comprising a first range of possible values representing an uncertainty for a true track to one of said vehicles based on relative coordinates calculated using said data messages, (ii) determine a second region comprising a second range of possible values representing an uncertainty of a location solution calculated using said signals received from said GNSS satellites, (iii) compare said first range of possible values of said first region to said second range of possible values of said second region, (iv) determine whether a pre-determined amount of said first region and said second region overlap and (v) increase a confidence level of a positional accuracy of said plurality of vehicles for position values that are determined to overlap if said pre-determined amount of said first region and said second region overlap, wherein one of said vehicles implements one or more automatic responses based on said confidence level of said positional accuracy.

2. The apparatus according to claim 1, wherein said automatic responses comprise safety features.

3. The apparatus according to claim 1, wherein said confidence level comprises an ASIL-classification.

4. The apparatus according to claim 3, wherein increasing said ASIL-classification enables autonomous driving capabilities.

5. The apparatus according to claim 1, wherein said automatic responses comprise reversible responses and irreversible responses.

6. The apparatus according to claim 5, wherein said reversible responses comprise at least one of adjusting a speed of one of said vehicles, changing lanes, seatbelt pre-tensioning, and navigation.

7. The apparatus according to claim 5, wherein said irreversible responses comprise deploying an airbag.

8. The apparatus according to claim 5, wherein (i) said processor is further configured to determine a size of overlap of said first region and said second region based on an amount of said first range of possible values that match said second range of possible values, (ii) enable said reversible responses if said size of overlap is greater than a first threshold, (iii) enable said irreversible responses if said size of overlap is greater than a second threshold and (iv) said second threshold is larger than said first threshold.

9. The apparatus according to claim 1, wherein said automatic responses comprise active responses and passive responses.

10. The apparatus according to claim 1, wherein said automatic responses comprise at least one of collision avoidance, impact mitigation, belt pre-tensioning, pre-crash side airbag deployment prior to a side impact, pre-crash bumper-bag deployment prior to a frontal impact, active blind spot assist, external signaling, headlight adjustment, mirror adjustment and navigation.

11. The apparatus according to claim 1, wherein (i) said relative coordinates and said signals received from said GNSS satellites each provide an independent measurement of a position parameter and (ii) said independent measurements of said position parameter are used to verify said positional accuracy.

12. The apparatus according to claim 1, wherein said pre-determined amount of said first region and said second region overlap provides a verification of said relative coordinates.

13. The apparatus according to claim 1, wherein said positional accuracy determined using said relative coordinates reduces a number of false positive and false negative readings from sensor readings.

14. The apparatus according to claim 1, wherein said processor is further configured (i) to receive sensor readings from a plurality of sensors, (ii) perform data fusion to make inferences based on said sensor readings and said relative coordinates and (iii) use said inferences to provide a 360-degree awareness near a vehicle.

15. The apparatus according to claim 1, wherein said processor is further configured to (i) cross-reference said relative coordinates with position data determined using said signals received from said GNSS satellites and (ii) discard said relative coordinates that do not overlap with said position data.

16. The apparatus according to claim 1, wherein said data messages comprise absolute distance measurements between said apparatus and one of said plurality of vehicles communicated alongside a Basic Safety Message (BSM).

* * * * *